US008836897B2

(12) United States Patent
Takeda et al.

(10) Patent No.: US 8,836,897 B2
(45) Date of Patent: Sep. 16, 2014

(54) LIQUID CRYSTAL DISPLAY DEVICE

(75) Inventors: Jun Takeda, Kanagawa (JP); Makoto Ishiguro, Kanagawa (JP); Isao Fujiwara, Kanagawa (JP); Hirofumi Toyama, Kanagawa (JP); Yoji Ito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 13/446,695

(22) Filed: Apr. 13, 2012

(65) Prior Publication Data
US 2012/0262651 A1 Oct. 18, 2012

(30) Foreign Application Priority Data

Apr. 15, 2011 (JP) ................................ 2011-091093

(51) Int. Cl.
*G02F 1/1335* (2006.01)
*G02F 1/1333* (2006.01)
*G03B 21/14* (2006.01)
*G02B 5/30* (2006.01)
*G02F 1/13363* (2006.01)

(52) U.S. Cl.
CPC .... *G02F 1/133371* (2013.01); *G02F 1/133514* (2013.01); *G02F 2001/133637* (2013.01); *G02F 2202/40* (2013.01); *G02F 2203/04* (2013.01); *G02F 1/133634* (2013.01); *G02F 2413/11* (2013.01); *G02F 2413/02* (2013.01); *G02F 2203/01* (2013.01); *G02F 2413/12* (2013.01)
USPC ......... 349/117; 349/106; 353/84; 359/489.07

(58) Field of Classification Search
None
See application file for complete search history.

(56) References Cited

U.S. PATENT DOCUMENTS

| | | | |
|---|---|---|---|
| 6,281,956 B1 | 8/2001 | Ohmuro et al. | |
| 6,642,981 B1 | 11/2003 | Ohmuro et al. | |
| 7,075,609 B2 | 7/2006 | Ohmuro et al. | |
| 7,379,140 B2 | 5/2008 | Ohmuro et al. | |
| 7,548,294 B2 | 6/2009 | Ohmuro et al. | |
| 7,808,592 B2 | 10/2010 | Ohmuro et al. | |
| 7,995,175 B2 | 8/2011 | Ohmuro et al. | |
| 2005/0248704 A1 | 11/2005 | Ohmuro et al. | |
| 2006/0203150 A1 | 9/2006 | Ohmuro et al. | |
| 2006/0268198 A1* | 11/2006 | Utsumi et al. | ................... 349/96 |
| 2008/0239213 A1 | 10/2008 | Ohmuro et al. | |
| 2009/0213305 A1 | 8/2009 | Ohmuro et al. | |
| 2010/0040854 A1* | 2/2010 | Takada et al. | ................. 428/220 |
| 2010/0271574 A1 | 10/2010 | Ikeda et al. | |
| 2010/0277678 A1 | 11/2010 | Ohmuro et al. | |

FOREIGN PATENT DOCUMENTS

| | | |
|---|---|---|
| JP | 08-207210 A | 8/1996 |
| JP | 3027805 B | 1/2000 |
| JP | 2003-033998 A | 2/2003 |
| JP | 3459779 B | 8/2003 |

* cited by examiner

*Primary Examiner* — Bumsuk Won
*Assistant Examiner* — Angela Davison
(74) *Attorney, Agent, or Firm* — Jean C. Edwards, Esq.; Edwards Neils PLLC

(57) ABSTRACT

A liquid crystal display device comprising a liquid crystal cell and a polarizer arranged on at least one outer side of the liquid crystal cell, wherein the liquid crystal cell includes a pair of substrates at least one of which has an electrode and which are arranged oppositely to each other, and a liquid crystal layer sandwiched between the substrates, and at least one substrate includes at least three color pixels of B, G and R satisfying the following formula (1-1), and the polarizer includes a polarizing element and a film satisfying the following formula (1-2) and containing an optically-anisotropic layer:

$$-20 \text{ nm} \leq \{Rth[\text{cell}](630) - Rth[\text{cell}](440)\} \leq 28 \text{ nm},\quad (1\text{-}1)$$

$$1 \text{ nm} < Re(630) - Re(440) \leq 12 \text{ nm}. \quad (1\text{-}2).$$

21 Claims, 1 Drawing Sheet

LIQUID CRYSTAL DISPLAY DEVICE

CROSS-REFERENCE TO RELATED APPLICATIONS

The present application claims the benefit of priority from Japanese Patent Application No. 2011-091093, filed on Apr. 15, 2011, the contents of which are herein incorporated by reference in their entirety.

BACKGROUND OF THE INVENTION

1. Field of the Invention

The present invention relates to a liquid crystal display device.

2. Description of the Related Art

With the recent tendency toward advancing TV use of liquid crystal display devices, the panel size of the devices is enlarged and high-definition and low-price liquid crystal display devices are much desired. In particular, VA-mode liquid crystal display devices have a relatively high contrast and enjoy a relatively high production yield, and have therefore become most popular liquid crystal display devices for TV use.

However, liquid crystal display devices, especially VA-mode liquid crystal display devices have a problem in that, at the time of black level of display, the devices could provide black display that is almost complete in the normal direction to the display panel, but when the black level panel is seen in oblique directions, there occurs light leakage to disable background black display whereby the viewing angle is narrowed.

For solving the problem of viewing angle characteristics, for example, there has been proposed a method of incorporating a combination of a first retardation plate having a positive monoaxial refractivity anisotropy and a second retardation plate of which the in-plane refractive index is sufficiently smaller than the thickness-direction refractive index thereof and which has a negative refractivity anisotropy, into a liquid crystal display device to thereby reduce the light leakage in watching the panel of the liquid crystal display device in oblique directions at the time of black level of display (for example, Patent Reference 1).

However, the method described in Patent Reference 1 is for reducing the light leakage only within a specific wavelength region (for example, green light at around 550 nm), and therefore in the method, there still occurs light leakage in the other wavelength region in which the wavelength dispersion characteristics of the retardation plates and the wavelength dispersion characteristics of the liquid crystal cell in the device are incompatible with each other (for example, blue light at around 450 nm and red light at around 650 nm). Accordingly, when the black display panel of the liquid crystal display device described in Patent Reference 1 is watched in oblique directions, then the panel is colored in blue or red, or that is, there occurs a problem of color shift. Consequently, the method described in Patent Reference 1 is still unsatisfactory in point of solving the problems of viewing angle characteristics.

As a method for solving the problem of color shift in watching the black display panel of the liquid crystal display device in oblique directions, improving the wavelength dispersion characteristics of the film for use in the retardation plate in the device has become investigated in order that the wavelength dispersion characteristics of the retardation plate and the wavelength dispersion characteristics of the liquid crystal cell in the device could be compatible with each other. As a method of improving the wavelength dispersion characteristics of a retardation plate, there has been disclosed a method of stretching a film of a cellulose acetate of which the degree of acylation falls within a specific range to thereby provide a cellulose acetate film having a larger birefringence at a longer wavelength (see Patent Reference 2).

On the other hand, Patent Reference 3 and Patent Reference 4 disclose a cellulose ester laminate film having a specific laminate structure and having a lowered haze. In these patent references, various characteristics of the film, such as the moisture permeability and the dimensional stability in addition to the haze thereof are investigated, however, nothing is investigated therein relating to the wavelength dispersion characteristics of retardation of the film.

As another method of solving the problem of color shift, there has been investigated a multigap configuration of a liquid crystal cell. This is a method of changing the thickness of the color filter in every pixel region of R, G and B (for example, the thickness of the color filter in the pixel region of R, G and B is settled as R pixel region<G pixel region<B pixel region) to thereby change the thickness (gap) of the liquid crystal layer in every pixel region of R, G and B (in this case, the thickness of the liquid crystal layer in each pixel region of R, G and B is: R pixel region>G pixel region>B pixel region). According to the method, the problem of color shift could be solved in some degree. For example, Patent Reference 5 describes a case where the thickness of the color filter in every color pixel of R, G and B is defined as R pixel region>G pixel region>B pixel region and the color filter is combined with a film having predetermined optical properties, thereby improving the viewing angle characteristics and the panel contrast.

CITATION LIST

Patent References

Patent Reference 1: Japanese Patent 3027805
Patent Reference 2: Japanese Patent 3459779
Patent Reference 3: JP-A 2003-33998
Patent Reference 4: JP-A 8-207210
Patent Reference 5: US 2010-0271574A1

The present inventors tried producing liquid crystal display devices having the configuration described in Patent References 2 and 5 and tried watching the black display panel of the devices in oblique directions, and have known that the liquid crystal display devices could not completely solve the problem of color shift. As it now stands so, further improvement is still desired for solving the problem of color shift.

The present invention has been made in consideration of the current situation as above, and its object is to provide a liquid crystal display device capable of significantly solving the problem of color shift in watching it in oblique directions at the time of black level of display.

SUMMARY OF THE INVENTION

For the purpose of solving the above-mentioned problem, the present inventors assiduously studied and tried producing a liquid crystal display device in which the values of the wavelength dispersion characteristics of the liquid crystal cell are selected to fall within a specific range and in which the values of the wavelength dispersion characteristics of the film containing an optically-anisotropic layer in the polarizer are selected to fall within a specific range, and have found that the thus-produced liquid crystal display device can significantly solve the problem of color shift as compared with the liquid crystal display devices having the configuration described in Patent References 2 and 5. Specifically, the above-mentioned problem can be solved by the following means.

[1] A liquid crystal display device comprising a liquid crystal cell and a polarizer arranged on at least one outer side of the liquid crystal cell, wherein:

the liquid crystal cell includes a pair of substrates at least one of which has an electrode and which are arranged oppositely to each other, and a liquid crystal layer sandwiched between the substrates, and at least one substrate includes at least three color pixels of B, G and R satisfying the following formula (1-1), and the polarizer includes a polarizing element and a film satisfying the following formula (1-2) and containing an optically-anisotropic layer:

$$-20 \text{ nm} \leq \{Rth[\text{cell}](630) - Rth[\text{cell}](440)\} \leq 28 \text{ nm}, \quad (1\text{-}1)$$

wherein $Rth[\text{cell}](\lambda)$ means the thickness-direction retardation of the liquid crystal cell when a light having a wavelength $\lambda$ passes through the pixel of the cell;

$$1 \text{ nm} < Re(630) - Re(440) \leq 12 \text{ nm}, \quad (1\text{-}2)$$

wherein $Re(630)$ means the in-plane retardation of the film at a wavelength of 630 nm, and $Re(440)$ means the in-plane retardation thereof at a wavelength of 440 nm.

[2] The liquid crystal display device of [1], wherein the film containing an optically-anisotropic layer of the polarizer satisfies the following formula (2):

$$3 \text{ nm} \leq Rth(630) - Rth(440) \leq 28 \text{ nm}, \quad (2)$$

wherein $Rth(630)$ means the thickness-direction retardation of the film at a wavelength of 630 nm, and $Rth(440)$ means the thickness-direction retardation thereof at a wavelength of 440 nm.

[3] The liquid crystal display device of [1] or [2], wherein the film containing an optically-anisotropic layer of the polarizer satisfies the following formula (3):

$$45 \text{ nm} \leq Re(550) \leq 60 \text{ nm}, \quad (3)$$

wherein $Re(550)$ means the in-plane retardation of the film at a wavelength of 550 nm.

[4] The liquid crystal display device of any one of [1] to [3], wherein the pixel satisfies the following formula (4):

$$-20 \text{ nm} \leq \{Rth[\text{cell}](630) - Rth[\text{cell}](440)\} \leq 20 \text{ nm}, \quad (4)$$

wherein $Rth[\text{cell}](\lambda)$ means the thickness-direction retardation of the liquid crystal cell when a light having a wavelength $\lambda$ passes through the pixel of the cell.

[5] The liquid crystal display device of any one of [1] to [4], wherein the pixel and the film containing an optically-anisotropic layer satisfy the following formula (5):

$$-5 \text{ nm} \leq \{Rth[\text{cell}](630) - Rth[\text{cell}](440)\}/2 - \{Re(630) - Re(440)\} \leq -3 \text{ nm}, \quad (5)$$

wherein $Rth[\text{cell}](\lambda)$ means the thickness-direction retardation of the liquid crystal cell when a light having a wavelength $\lambda$ passes through the pixel of the cell, $Re(630)$ means the in-plane retardation of the film at a wavelength of 630 nm, and $Re(440)$ means the in-plane retardation thereof at a wavelength of 440 nm.

[6] The liquid crystal display device of any one of [1] to [5], wherein the liquid crystal cell is a VA-mode cell.

[7] The liquid crystal display device of any one of [1] to [6], wherein the film containing an optically-anisotropic layer of the polarizer is a cellulose acylate film.

The liquid crystal display device of the invention significantly solves the problem of color shift in watching it in oblique directions at the time of black level of display.

BEST MODE FOR CARRYING OUT THE INVENTION

Figure 1:
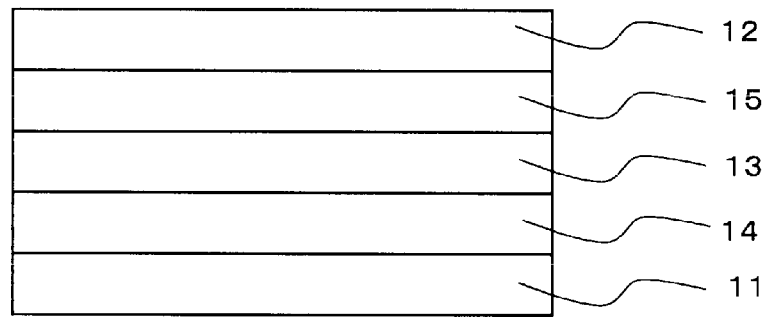
FIG. 1 is a schematic cross-sectional view of one example of the liquid crystal display device of the invention.

The liquid crystal display device of the invention and its production method, and the members to be used for the device are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Liquid Crystal Display Device]

The liquid crystal display device of the invention comprises a liquid crystal cell and a polarizer arranged on at least one outer side of the liquid crystal cell, wherein the liquid crystal cell includes a pair of substrates at least one of which has an electrode and which are arranged oppositely to each other, and a liquid crystal layer sandwiched between the substrates, and at least one substrate includes at least three color pixels of B, G and R satisfying the following formula (1-1), and the polarizer includes a polarizing element and a film satisfying the following formula (1-2) and containing an optically-anisotropic layer.

$$-20 \text{ nm} \leq \{Rth[\text{cell}](630) - Rth[\text{cell}](440)\} \leq 28 \text{ nm} \quad (1\text{-}1)$$

In the formula (1-1), $Rth[\text{cell}](\lambda)$ means the thickness-direction retardation of the liquid crystal cell when a light having a wavelength $\lambda$ passes through the pixel of the cell.

$$1 \text{ nm} < Re(630) - Re(440) \leq 12 \text{ nm} \quad (1\text{-}2)$$

In the formula (1-2), $Re(630)$ means the in-plane retardation of the film at a wavelength of 630 nm, and $Re(440)$ means the in-plane retardation thereof at a wavelength of 440 nm.

The liquid crystal display device of the invention is preferably an IPS, OCB or VA-mode liquid crystal display device, more preferably a VA-mode liquid crystal display device.

In the liquid crystal display device of the invention, the constitution of the film of the polarizer, which satisfies the above-mentioned formula (1-2) and which contains an optically-anisotropic layer, is not specifically defined. The film containing an optically-anisotropic layer may be a single layer or may be a laminate of two or more layers. In case where the film containing an optically-anisotropic layer is a single layer, preferably, the film is a self-supporting film that has a property of an optically-anisotropic layer. On the other hand, in case where the film containing an optically-anisotropic layer is a laminate of two or more layers, the laminate may be composed of two separate layers of a liquid crystal compound layer and a polymer film support to support the layer, or may be a laminate of two or more self-supporting films having a property of an optically-anisotropic layer, or may also be a laminate comprising a self-supporting film that has a property of an optically-anisotropic layer and an optically-isotropic self-supporting film. Above all, as one preferred embodiment of the invention, the film is preferably a laminate of two or more self-supporting polymer films having a property of an optically-anisotropic layer, more preferably a cellulose acylate laminate film prepared by three-layer co-casting of different cellulose acylate dopes each having a different degree of acyl substitution.

In the following, mainly described is are some preferred embodiments of the liquid crystal display device of the invention in which the liquid crystal cell is a VA-mode liquid crystal cell and the polarizer includes a cellulose acylate laminate film prepared by three-layer co-casting of different cellulose acylate dopes each having a different degree of acyl substitution; however, the invention is not limited to those embodiments.

One preferred embodiment of the liquid crystal display device of the invention is described in point of the configuration thereof with reference to the drawings attached hereto.

Figure 2:
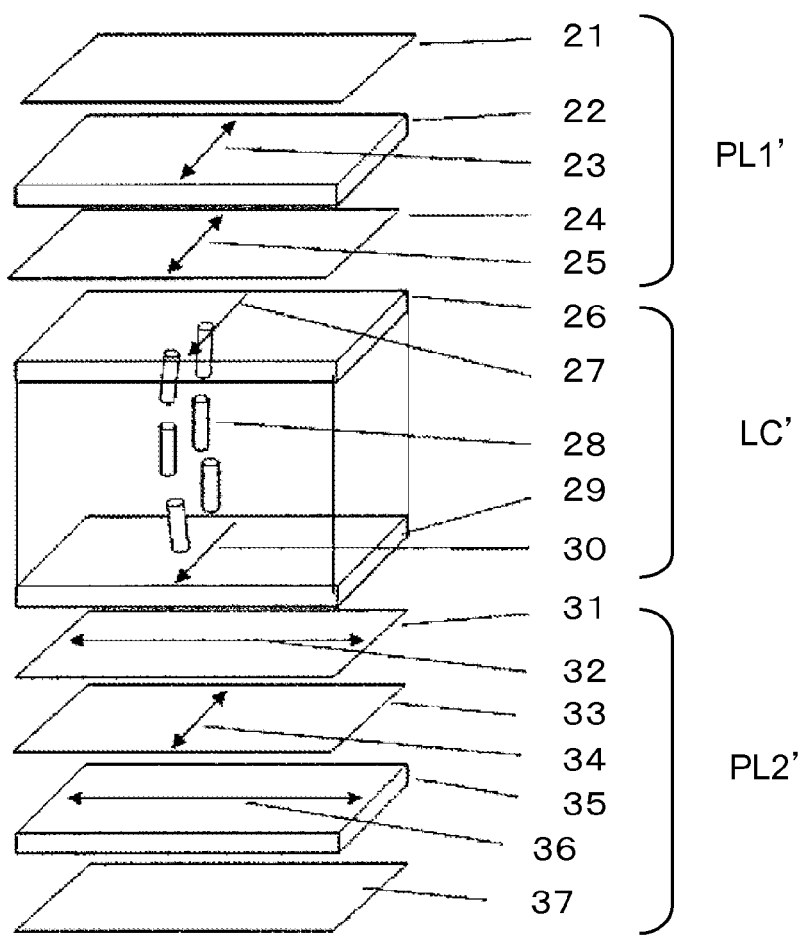
FIG. 2 is a schematic cross-sectional view of another example of the liquid crystal display device of the invention.

The liquid crystal display device of the invention shown in FIG. 2 is a transmission-type device, preferably having two polarizers. Preferably, the device has a liquid crystal cell LC' (26 to 30), and an upper polarizer PL1' and a lower polarizer PL2' arranged to sandwich the liquid crystal cell LC' therebetween.

<Liquid Crystal Cell>

The liquid crystal display device of the invention has a liquid crystal cell. First described is the liquid crystal cell.

In the invention, the liquid crystal cell includes a pair of substrates at least one of which has an electrode and which are arranged oppositely to each other, and a liquid crystal layer sandwiched between the substrates, and at least one substrate includes at least three color pixels of B, R and G satisfying the above-mentioned formula (1-1).

In the invention, the pixel B is a pixel that transmits blue light; and similarly, the pixel G is a pixel that transmits green light, and the pixel R is a pixel that transmits red light. For expressing the optical properties of these pixels in this description, the blue light, the green light and the red light are expressed as the values measured at a wavelength of 440 nm, 550 nm and 630 nm, respectively.

(Electrode Substrate)

At least one of the above-mentioned one pair of substrates has an electrode.

Preferably, the rubbing direction 27 of the upper substrate 26 of the liquid crystal cell LC' and the rubbing direction 30 of the lower substrate 29 therein are set to be parallel to each other so that the liquid crystal layer is not twist-aligned. Preferably, the upper substrate 26 and the lower substrate 29 each have an alignment film (not shown) and an electrode layer (not shown). The alignment film has the function of aligning the liquid crystal molecules 28 in a predetermined direction under the condition where no driving voltage is applied to the device. The electrode layer has the function of applying a voltage to the liquid crystal molecules 28. Preferably, the electrode layer is, in general, formed of a transparent conductive film.

(Liquid Crystal Layer)

As one example of the VA-mode liquid crystal cell LC', there is mentioned a liquid crystal cell that comprises a liquid crystal layer of a liquid crystal having negative dielectric anisotropy and having $\Delta n=0.0813$ and $\Delta\varepsilon=-4.6$ or so (for example, Merck's MLC-6608) as sandwiched between upper and lower substrates 26 and 29 for the cell. For example, in the case of the VA-type driving mode, preferably, the director that indicates the alignment direction of the liquid crystal molecules to be processed for alignment, or that is, the tilt angle thereof to the substrate face is controlled to be at around 90°. In a liquid crystal panel in which the thickness d of the liquid crystal layer is controlled to be around 3.5 μm, when the thickness d of the liquid crystal layer is changed, then the product of the thickness d and the refractivity anisotropy $\Delta n$ of the layer, $\Delta nd$ changes and the brightness at the time of white level of display is thereby changed.

Though the detailed configuration thereof is not shown in FIG. 2, the liquid crystal cell LC' may have an embodiment, as one example thereof, that comprises three color pixel regions, in which the thickness of the liquid crystal layer in each pixel region may be so controlled as to have a different product, $\Delta nd$ of the refractivity anisotropy and the thickness thereof.

The method of changing the thickness d of the liquid crystal layer in each pixel region is not specifically defined. For example, any one or more layers to be formed on the opposing faces of the liquid crystal cell LC, for example, an alignment layer, an electrode layer, an optically-anisotropic layer, a color filter layer and the like are change in point of the thickness thereof in each pixel region whereby the thickness of the liquid crystal layer may be changed in each pixel region. In particular, it is desirable that the thickness of the color filter layer is changed in each pixel region to thereby control $\Delta nd$ of the liquid crystal layer therein.

However, many color filters have retardation, and when the thickness thereof is changed, then $\Delta nd$ of the color filter in each pixel region may change.

In other words, the invention provides constructing optical compensation suitable to each pixel by making the total of $\Delta nd$ of the liquid crystal layer and $\Delta nd$ of the color filter in the three pixel regions of the liquid crystal cell match with the wavelength dispersion characteristics of the optical compensatory film.

More concretely, for example, it is desirable that, on the opposing faces of the substrate (26 or 29), an RGB color filter is formed in which the R layer, the G layer and the B layer differ from each other in the thickness thereof, and the total of $\Delta nd$ of the liquid crystal layer in each pixel region and that of the color filter therein is made to differ between these pixel regions. Apart from this, a substrate that comprises multiple regions each having a different thickness may be used so as to make the liquid crystal layer in the position corresponding to each pixel region have a different thickness.

(Color Filter-Containing Substrate)

In the invention, at least one substrate of the liquid crystal cell includes at least three color pixels of B, G and R satisfying the above-mentioned formula (1-1). More preferably, the pixels are three color pixels of B, G and R. In the invention, even more preferably, the pixels-containing substrate is a color filter substrate, and the color filter substrate may contain, in addition to the color filter, any other known members (transparent substrate, opposite electrode). In an especially preferred embodiment of the liquid crystal display device of FIG. 2, the pixels-containing substrate is a color filter substrate having a color filter that comprises an R pixel (hereinafter this may be referred to as an R layer), a G pixel (hereinafter as a G layer) and a B pixel (hereinafter as a B layer). In such an especially preferred embodiment, incase where the results of the retardation values with the light that runs through each pixel in retardation measurement (axometry) of the liquid crystal cell at a different wavelength are represented by Rth[cell] (440), Rth[cell](550) and Rth[cell](630), then the pixels satisfy the following formula (1-1):

$$-20\ nm \leq \{Rth[\text{cell}](630)-Rth[\text{cell}](440)\} \leq 28\ nm, \quad (1\text{-}1)$$

In the formula (1-1), Rth[cell] (λ) means the thickness-direction retardation of the liquid crystal cell when a light having a wavelength λ passes through the pixel of the cell.

In the invention, more preferably, the pixels satisfy the following formula (4):

$$-20\ nm \leq \{Rth[\text{cell}](630)-Rth[\text{cell}](440)\} \leq 20\ nm. \quad (4)$$

More preferably, {Rth[cell](630)−Rth[cell](440)} of the pixels is from −18 to 18 nm, most preferably from −15 to 15 nm.

Also preferably, the thickness dB, dG and dR (unit: μm) of the color filter of the above-mentioned pixel B, pixel G and pixel R satisfies dB>dG>dR.

Regarding the thickness dB, dG and dR (unit: μm) of the color filter of the above-mentioned pixel B, pixel G and pixel R, preferably, dB is at most 2.5 μm, more preferably at most 2.2 μm; dG is preferably at most 2.4 μm, more preferably at most 2.1 μm; and dR is preferably at most 2.4 μm, more preferably at most 2.1 μm.

In the preferred embodiment of the invention, the liquid crystal cell satisfies the specific optical relationship to the film containing an optically-anisotropic layer in the polarizer, whereby the liquid crystal display device can solve the problems of color shift and viewing angle contrast reduction in watching it in oblique directions at the time of black level of display, and the front contrast of the device when watched in the front direction can be further enhanced.

Concretely, in the liquid crystal display device of the invention, it is desirable that the pixels and the film containing an optically-anisotropic layer satisfy the following formula (5):

$$-5 \text{ nm} \leq \{Rth[\text{cell}](630)-Rth[\text{cell}](440)\}/2-\{Re(630)-Re(440)\} \leq -3 \text{ nm} \quad (5)$$

In the formula (5), Rth[cell] (λ) means the thickness-direction retardation of the liquid crystal cell when a light having a wavelength passes through the pixel of the cell, Re (630) means the in-plane retardation of the film at a wavelength of 630 nm, and Re (440) means the in-plane retardation thereof at a wavelength of 440 nm.

More preferably, the value of {Rth[cell] (630)−Rth[cell] (440)}/2−{Re (630)−Re (440)} is from −5.0 to −3.2 nm, most preferably from −4.7 to −3.4 nm.

The upper polarizer PL1' to be arranged outside the liquid crystal cell LC' includes a polarizing film (hereinafter this may be referred to as a polarizing element) 22, and, as arranged on the surfaces of the polarizing film 22, a protective film 21 and an optically-anisotropic layer 24. The lower polarizer PL2' has a polarizing film 35, protective films 32 and 37 as arranged on the surfaces of the polarizing film 35, and an optically-anisotropic layer 31. The polarizing films 22 and 35 are so arranged that the absorption axes 23 and 36 thereof could be nearly perpendicular to each other. The optically-anisotropic layer 31 contributes toward reducing light leakage that may occur in oblique directions at the time of black level of display, and therefore toward enhancing the contrast of the display panel. The optically-anisotropic layer 31 may be formed of, for example, a composition containing a liquid crystal compound, or may be a polymer film having a birefringence. In case where the layer is formed of a liquid crystal composition, the protective film may serve as the support for the optically-anisotropic layer 31. Needless-to-say, an optical compensatory sheet comprising an optically-anisotropic layer and a support such as a polymer film or the like may be arranged separately from the polarizer. As described above, the two optically-anisotropic layers may be formed of the same polymer film or may be formed of different polymer films, but preferably, the layer is a cellulose acylate laminate film formed by three-layer co-casting of multiple cellulose acylate films each having a different degree of acyl substitution. On the other hand, for the protective films 21 and 37 of those of the polarizer that are arranged on the surface side of the polarizer, in general, commercial cellulose acylate films and the like usable as protective films can be used here; and for example, commercially-available "KC4UX2M" (by Konica-Opt, having a thickness of 40 μm), "KC5UX" (by Konica-Opt, having a thickness of 60 μm), "TD80UL" (by FUJIFILM, having a thickness of 80 μm) and the like are usable here. Needless-to-say, however, the invention is not limited to these. Preferred embodiments of the film containing an optically-anisotropic layer of the polarizer are described below.

A case where a light comes in the device from the backlight (not shown) arranged outside the lower polarizer PL2' is taken into consideration. In the non-driving condition where a driving voltage is not applied to the transparent electrode (not shown) arranged on the inner surface the upper substrate 26 and that of the lower substrate 29, the liquid crystal molecules 28 in the liquid crystal layer are aligned nearly perpendicular to the substrate face, and as a result, the polarization state of the light passing through the liquid crystal layer does not almost change. The absorption axis 36 of the polarizing film 35 and the absorption axis 23 of the polarizing film 22 are perpendicular to each other, and therefore the light having been in a predetermined polarization state after having passed through the polarizing film 35 is absorbed by the polarizing film 22, not receiving the birefringent effect of the liquid crystal molecules 28. Accordingly, the liquid crystal display device of FIG. 2 is in a black display state in the non-driving condition. As opposed to this, in the driving condition, the liquid crystal molecules 28 are tilted in the substrate direction and are aligned nearly in parallel to the substrate face, and consequently, the light having passed through the liquid crystal layer changes its polarization state owing to the birefringence of the liquid crystal molecules 28 that are in such an aligned state, and as a result, the light then passes through the polarizing film 22. Accordingly, the liquid crystal display device of FIG. 2 is in a black display state in the driving condition.

The VA-mode device is characterized by high-speed response and high contrast. The VA-mode device may have a high contrast in the front direction but is problematic in that the contrast thereof worsens in oblique directions. At the time of black level of display, the liquid crystal molecules are aligned perpendicularly to the substrate face. In this condition, when the device is watched in the front direction, there occurs little birefringence of the liquid crystal molecules therein and therefore the transmittance is low and the contrast is high. However, when watched in oblique directions, there occurs birefringence of the liquid crystal molecules in the device. Moreover, the crossing angle of the absorption axes of the upper and lower polarizers is 90°, or that is, the absorption axes of the two cross at right angles in the front direction; however, in oblique directions, the crossing angle is larger than 90°. Because of these two factors, there occur problems of light leakage and color shift in oblique directions and the contrast is thereby lowered. In the liquid crystal display device of the invention, the wavelength dispersion characteristics of the retardation (Re and/or Rth) of the optically-anisotropic layer 31, and also those of the retardation (Re and/or Rth) of the protective films 23 and 32, in case where a birefringent polymer film is used for the protective films, are controlled to fall within a specific range, and are combined with the wavelength dispersion characteristics of the retardation of the liquid crystal cell as also controlled to fall within a specific range, whereby the liquid crystal display device of the invention can significantly solve the problem of color shift in watching it in oblique directions at the time of black level of display. In addition, when the members are so controlled as to satisfy the optical characteristics capable of reducing color shift to occur in oblique directions owing to the above-mentioned two factors, and additionally in case where the optical characteristics of those members are further controlled to fall within a preferred range, then the liquid crystal display device of the invention is more preferred as capable of displaying high-contrast images in a broad viewing angle.

At the time of white level of display, the liquid crystal molecules are aligned nearly in parallel to the substrate face, but when they are not completely in parallel thereto, there exists anisotropy in the level of birefringence of the liquid crystal molecules even at the time of white level of display, therefore bringing about some difference in brightness and color tone. For reducing the anisotropy in the level of the birefringence of the liquid crystal molecules at the time of white level of display, a multidomain structure may be employed in which one pixel in the liquid crystal display device is divided into multiple domains. Accordingly, it is desirable that the pixel region of RGB is separately divided into multiple domains. Though not shown in FIG. 2, TFT may be arranged in each pixel region of the other substrate corresponding to the pixels-containing substrate (preferably, color filter substrate) for image display in the liquid crystal display device, and the viewing angle characteristics of the device can be thereby enhanced by controlling the voltage to be applied thereto or by selecting the device driving method. In this case, the other substrate corresponding to the pixels-containing substrate is referred to as a TFT substrate. Preferably, the liquid crystal display device of the invention is so designed that the lower substrate of the liquid crystal cell is a TFT substrate, and the upper substrate of the liquid crystal cell is a color filter substrate, and a liquid crystal layer is sandwiched between them.

In the VA-mode liquid crystal display device, a chiral agent that is generally used in a TN-mode liquid crystal display device is used little as degrading the dynamic responsive characteristic of the device, but may be used therein for reducing alignment failure.

<Polarizer>

The liquid crystal display device of the invention has a polarizer arranged on at least one outer side of the liquid crystal cell therein, and is characterized in that the polarizer includes a polarizing element and a film containing an optically-anisotropic layer and satisfying the following formula (1-2):

$$1 \text{ nm} < Re(630) - Re(440) \leq 12 \text{ nm} \quad (1\text{-}2)$$

In the formula (1-2), Re(630) means the in-plane retardation of the film at a wavelength of 630 nm, and Re(440) means the in-plane retardation thereof at a wavelength of 440 nm.

Regarding the embodiment thereof, the polarizer for use in the invention includes not only an embodiment of a film sheet cut in a size capable of being directly incorporated in a liquid crystal display device but also an embodiment of a film roll produced as a long film in continuous production and wound up into a roll (for example, an embodiment having a roll length of at least 2500 m or at least 3900m). For use in large-panel liquid crystal display devices, the width of the polarizer is preferably at least 1470 mm, as so mentioned in the above.

For the concrete constitution of the polarizer of the invention, any known constitution is employable with no limitation thereon. For example, the constitution described in FIG. 6 in JP-A 2008-262161 may be employed here.

Also not specifically defined, the polarizing element for use herein may be any known one.

In the following, the cellulose acylate film that may be used as the film having an optically-anisotropic layer of the polarizer in the liquid crystal display device of the invention, and the method for producing the film, as well as the additives usable in the film are described in detail. In the following description, referred to is a cellulose acylate laminate film as an example of the cellulose acylate film usable in the invention; however, not limited thereto, any other cellulose acylate film having no laminating configuration is usable in the invention.

The description of the constitutive elements given hereinunder is for some typical embodiments of the invention, to which, however, the invention should not be limited.

No specific limitation is given to the film having an optically-anisotropic layer in the polarizer in the liquid crystal display device of the invention, as described above. For the film, for example, employable here is a cellulose acylate film. As also described above, it is more desirable that the film having an optically-anisotropic layer is a laminate of two or more self-supporting polymer films each having the necessary properties of an optically-anisotropic layer, and even more preferred is a cellulose acylate laminate film prepared by three-layer co-casting of multiple cellulose acylate dopes each having a different degree of acyl substitution.

Above all, still more preferred for use herein is a cellulose acylate laminate film, which comprises a low-substitution layer that contains a cellulose acylate satisfying the following formula (101) and a non-phosphate compound, and, as laminated on at least one side of the low-substitution layer, a high-substitution layer that contains a cellulose acylate satisfying the following formula (102), and of which the in-plane retardation at a wavelength of 550 nm, Re(550) is larger than the in-plane retardation thereof at a wavelength of 440 nm, Re(440).

$$2.0 < Z1 < 2.7 \quad (101)$$

In the formula (101), Z1 represents the total degree of acyl substitution of the cellulose acylate of the low-substitution layer.

$$2.7 < Z2 \quad (102)$$

In the formula (102), Z2 represents the total degree of acyl substitution of the cellulose acylate of the high-substitution layer.

The cellulose acylate laminate film having the constitution as above is controlled in accordance with the characteristics of the liquid crystal cell with which the wavelength dispersion characteristics of retardation of the film are compatible. The point that, when the cellulose acylate laminate film that serves as the optically-anisotropic layer-having film in a liquid crystal display device has the wavelength dispersion characteristics of retardation as above, then the device can solve the problem of color shift to occur in watching it in oblique directions at the time of black level of display is described in JP-A 2008-262161. In the invention, in addition, the wavelength dispersion characteristics of Re of the optically-anisotropic layer-containing film in the liquid crystal display device are further restricted to fall within a specific range and are combined with the wavelength dispersion characteristics of retardation of the liquid crystal cell therein, as defined to fall within a specific range, whereby the device can more significantly solve the problem of color shift.

The invention is described in more detail hereinunder with reference to some preferred embodiments of the cellulose acylate laminate film described below.

(Cellulose Acylate)

In the cellulose acylate laminate film for use in the liquid crystal display device of the invention, the total degree of acyl substitution in the cellulose acylate to form the constituent layer may satisfy the above-mentioned formula (101) or (102). The starting cellulose for the cellulose acylate includes cotton linter and wood pulp (hardwood pulp, softwood pulp), etc.; and any cellulose obtained from any starting cellulose can be used herein. As the case may be, different starting celluloses may be mixed for use herein. The starting cellulose materials are described in detail, for example, in Marusawa & Uda's "Plastic Material Lecture (17), Cellulosic Resin" (by Nikkan Kogyo Shinbun, 1970), and in Hatsumei Kyokai Disclosure Bulletin No. 2001-1745, pp. 7-8, and cellulose materials described in these may be used here.

Only one or two or more different types of acyl groups may be used, either singly or as combined, in the cellulose acylate. Preferably, the cellulose acylate for the film containing an optically-anisotropic layer in the invention has an acyl group with from 2 to 4 carbon atoms as the substituent therein. In case where the acylate has two or more different types of acyl groups, preferably, one of them is an acetyl group; and as the acyl group having from 2 to 4 carbon atoms, preferred is a propionyl group or a butyryl group. The cellulose acylate can form a solution having good solubility, and in particular it forms a good solution in a non-chlorine organic solvent. Another advantage is that the cellulose acylate can form a solution having a low viscosity and having good filterability.

The cellulose acylate preferably used in the invention is described in detail. The β-1,4-bonding glucose unit to constitute cellulose has a free hydroxyl group at the 2-, 3- and 6-positions. The cellulose acylate is a polymer produced by esterifying a part or all of those hydroxyl groups in cellulose with an acyl group. The degree of acyl substitution means the total of the ratio of acylation of the hydroxyl group in cellulose positioned in the 2-, 3- and 6-positions in the unit therein. In case where the hydroxyl group is 100% esterified at each position, the degree of substitution at that position is 1.

Not specifically defined, the acyl group having at least 2 carbon atoms in the cellulose acylate may be an aliphatic group or an aryl group. For example, the ester is an alkylcarbonyl ester, an alkenylcarbonyl ester, an aromatic carbonyl ester or an aromatic alkylcarbonyl ester of cellulose, in which the acyl group may be further substituted. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleoyl group, a benzoyl group, a naphthylcarbonyl group, a cinnamoyl group, etc. Of those, preferred are an acetyl group, a propionyl group, a butanoyl group, a dodecanoyl group, an octadecanoyl group, a tert-butanoyl group, an oleoyl group, a benzoyl group, a naphthylcarbonyl group, and a cinnamoyl group; more preferred are an acetyl group, a propionyl group and a butanoyl group (acyl group having from 2 to 4 carbon atoms). Even more preferred is an acetyl group (in this case, the cellulose acylate is a cellulose acetate).

In case where an acid anhydride or an acid chloride is used as the acylating agent for acylation of cellulose, an organic acid such as acetic acid, or methylene chloride or the like may be used as the organic solvent to be the reaction solvent.

In case where the acylating agent is an acid anhydride, the catalyst is preferably a protic catalyst such as sulfuric acid; and in case where the acylating agent is an acid chloride (e.g., $CH_3CH_2COCl$), a basic compound may be used as the catalyst.

A most popular industrial-scale production method for a mixed fatty acid ester of cellulose comprises acylating cellulose with a mixed organic acid component that contains a fatty acid (e.g., acetic acid, propionic acid, valeric acid) corresponding to an acetyl group or other acyl group, or its acid anhydride.

Preferably, in the film containing an optically-anisotropic layer for use in the polarizer in the liquid crystal display device of the invention, the cellulose acylate for the low-substitution layer satisfies the following formulae (103) and (104) from the viewpoint of the wavelength dispersion characteristics of retardation of the film.

$$1.0 < X1 < 2.7 \tag{103}$$

In the formula (103), X1 means the degree of substitution with an acetyl group in the cellulose acylate for the low-substitution layer.

$$0 \leq Y1 < 1.5 \tag{104}$$

In the formula (104), Y1 means the total degree of substitution with an acyl group having at least 3 carbon atoms in the cellulose acylate for the low-substitution layer.

X1 and Y1 satisfy a relationship of $X1+Y1=Z1$, with Z1 in the above-mentioned formula (101).

Preferably, in the film containing an optically-anisotropic layer, the cellulose acylate for the high-substitution layer satisfies the following formulae (105) and (106) from the viewpoint of the wavelength dispersion characteristics of retardation of the film.

$$1.2 < X2 < 3.0 \tag{105}$$

In the formula (105), X2 means the degree of substitution with an acetyl group in the cellulose acylate for the high-substitution layer.

$$0 \leq Y2 < 1.5 \tag{106}$$

In the formula (106), Y2 means the total degree of substitution with an acyl group having at least 3 carbon atoms in the cellulose acylate for the high-substitution layer.

X2 and Y2 satisfy a relationship of $X2+Y2=Z2$, with Z2 in the above-mentioned formula (102).

The cellulose acylate for use for the film containing an optically-anisotropic layer can be produced, for example, according to the method described in JP-A 10-45804.

It is known that cellulose acylate contains minor metal ingredients mainly caused by the production process thereof.

It is known that the minor metal ingredients stain the surface of the casting support in film formation, therefore worsening the film quality and bringing about production failure, and are therefore the amount thereof is desired to be smaller.

The minor metal ingredients may be quantified by analyzing the cellulose acylate to be used for forming the film, through ion chromatography, atomic absorptiometry, ICP, ICP-MS or the like.

(Non-Phosphate Compound)

Preferably, the film containing an optically-anisotropic layer contains a non-phosphate compound in the low-substitution layer therein. The non-phosphate compound, if any in the layer, exhibits an effect of reducing the haze of the film. Another effect of the compound is that, even when the Nz factor, which will be described below, of the film containing an optically-anisotropic layer is low, the film can still enjoy both advantages of good retardation and low haze.

In this description, "non-phosphate compound" means "a compound having an ester bond, in which the acid contributing toward the ester bond is any other acid than phosphoric acid". In other words, the "non-phosphate compound" means an ester compound not containing a phosphoric acid moiety.

The non-phosphate compound may be a low-molecular compound or a polymer (high-molecular compound). The polymer (high-molecular compound) of the non-phosphate compound may be hereinafter referred to as a non-phosphate polymer.

In the film containing an optically-anisotropic layer, preferably, the high-substitution layer contains the above-mentioned non-phosphate compound as an additive therein, and the ratio (part by mass) of the additive relative to the cellulose acylate contained in the high-substitution layer is smaller than the ratio (part by mass) of the additive relative to the cellulose acylate contained in the low-substitution layer, from the viewpoint of reducing the haze of the film. The non-phosphate compound usable in the invention is described in detail hereinunder.

As the non-phosphate compound, widely used here are high-molecular additives and low-molecular additives that are known as additives to cellulose acylate film. As the low-molecular additives, preferred is use of sugar ester compounds to be mentioned below. The content of the additive is preferably from 1 to 35% by mass of the cellulose resin in the film, more preferably from 4 to 30% by mass, even more preferably from 10 to 25% by mass.

(1) High-Molecular Additive:

The high-molecular additive that may be used as the non-phosphate compound to be contained in the film containing an optically-anisotropic layer is preferably a compound containing a recurring unit therein and having a number-average molecular weight of from 700 to 10000. The high-molecular additive additionally has a function of promoting the solvent evaporation speed and a function of reducing the residual solvent amount in solution casting film formation. The additive has still other advantages in point of film quality modification of improving the mechanical properties of the film, softening the film, imparting water absorption resistance to the film, reducing the moisture permeability of the film, etc.

More preferably, the number-average molecular weight of the high-molecular additive of the non-phosphate compound for use in the invention is from 700 to 8000, even more preferably from 700 to 5000, still more preferably from 1000 to 5000.

The high-molecular additive of the non-phosphate compound for use in the invention is described in detail hereinunder with reference to specific examples thereof; needless-to-say, however, the high-molecular additive of the non-phosphate compound for use in the invention is not limited thereto.

Preferably, the non-phosphate compound is a non-phosphate ester compound. "Non-phosphate ester compound" means an ester compound not containing a phosphate moiety.

The high-molecular additive of the non-phosphate compound includes polyester polymers (aliphatic polyester polymers, aromatic polyester polymers, etc.), copolymers of a polyester ingredient with any other ingredient, etc. Preferred are aliphatic polyester polymers, aromatic polyester polymers, copolymers of a polyester polymer (aliphatic polyester polymer, aromatic polyester polymer, etc.) with an acrylic polymer, and copolymers of a polyester polymer (aliphatic polyester polymer, aromatic polyester polymer, etc.) with a styrenic polymer; and more preferred are polyester compounds having an aromatic ring as at least one copolymerizing ingredient therein.

The aliphatic polyester polymer is prepared through reaction of an aliphatic dicarboxylic acid having from 2 to 20 carbon atoms, with at least one diol selected from an aliphatic diol having from 2 to 12 carbon atoms and an alkyl ether diol having from 4 to 20 carbon atoms, in which the two ends may be as such just in the reaction products but may be end-capped through additional reaction with a monocarboxylic acid, a monoalcohol or a phenol. The end-capping may be attained in order that the polyester polymer does not contain a free carboxylic acid therein, and may be effective from the viewpoint of the preservability of the polymer. The dicarboxylic acid for use in the polyester polymer in the invention is preferably for an aliphatic dicarboxylic acid residue having from 4 to 20 carbon atoms or for an aromatic dicarboxylic acid residue having from 8 to 20 carbon atoms.

The aliphatic dicarboxylic acids having from 2 to 20 carbon atoms preferably used in the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

More preferred aliphatic dicarboxylic acids in these are malonic acid, succinic acid, maleic acid, fumaric acid, glutaric acid, adipic acid, azelaic acid, 1,4-cyclohexanedicarboxylic acid. Particularly preferred aliphatic dicarboxylic acids are succinic acid, glutaric acid and adipic acid.

The diol used for the high molecular weight agent are selected, for example, from aliphatic diols having from 2 to 20 carbon atoms and alkyl ether diols having from 4 to 20 carbon atoms.

Examples of the aliphatic diol having from 2 to 20 carbon atoms include an alkyldiol and an alicyclic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylolpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol, polypropylene ether glycol, and combinations of these. The average degree of polymerization is not limited in particular, and it is preferably from 2 to 20, more preferably from 2 to 10, further preferably from 2 to 5, especially preferably from 2 to 4. As these examples, Carbowax resin, Pluronics resin and Niax resin are commercially available as typically useful polyether glycols.

In the invention, especially preferred is a high molecular weight agent of which the terminal is blocked with an alkyl group or an aromatic group. The terminal protection with a hydrophobic functional group is effective against aging at high temperature and high humidity, by which the hydrolysis of the ester group is retarded.

Preferably, the high molecular weight agent is protected with a monoalcohol residue or a monocarboxylic acid residue in order that both ends of the high molecular weight agent are not a carboxylic acid or a hydroxyl group.

In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol and benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, p-tert-amylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The high molecular weight agent may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The compounds having a positive birefringence are described in detail in Koichi Murai's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

The aromatic polyester-type polymers are those produced by copolymerization of the polyester polymer and a monomer having an aromatic ring. The monomer having an aromatic ring is preferably at least one monomer selected from an aromatic dicarboxylic acid having from 8 to 20 carbon atoms and an aromatic diol having from 6 to 20 carbon atoms.

The aromatic dicarboxylic acids having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid, 2,6-naphthalene dicarboxylic acid, etc. More preferred aromatic dicarboxylic acids in these are phthalic acid, terephthalic acid and isophthalic acid.

Specific examples of aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

For the aromatic polyester polymer, in this invention, combined is the above-mentioned polyester and at least one of aromatic dicarboxylic acids and aromatic diols, in which the combination mode is not specifically defined. Different types of the ingredients may be combined in any desired mode. In the invention, especially preferred is the polymer additive terminated with an alkyl group or an aromatic group, as described above. For the termination, employable is the above-mentioned method.

(2) Sugar Ester Compound:

Preferably, the film containing an optically-anisotropic layer for use in the invention contains a sugar ester compound.

Adding a sugar ester compound to the cellulose acylate film does not have any negative influence on the internal haze of the film in wet heat treatment after stretching, and does not detract from the ability of the film to express the optical properties thereof. Further, when the cellulose acylate film of the type is used in a liquid crystal display device, the front contrast of the device can be significantly improved.

—Sugar Residue—

The sugar ester compound means a compound where at least one substitutable group (for example, hydroxyl group, carboxyl group) in the monose or polyose constituting the compound is ester-bonded to at least one substituent therein. Specifically, the sugar ester compound as referred to herein includes sugar derivatives in a broad sense of the word, and for example, includes compounds having a sugar residue as the structural unit thereof such as gluconic acid. Concretely, the sugar ester compound includes an ester of glucose and a carboxylic acid, and an ester of gluconic acid and an alcohol.

The substitutable group in the monose or polyose constituting the sugar ester compound is preferably a hydroxyl group.

The sugar ester compound includes a monose or polyose-derived structure (hereinafter this may be referred to as a sugar residue) that constitutes the sugar ester compound. The structure per monose of the sugar residue is referred to as the structural unit of the sugar ester compound. The structural unit of the sugar ester compound preferably includes a pyranose structural unit or a furanose structural unit, more preferably, all the sugar residues are pyranose structural units or furanose structural units. In case where the sugar ester is formed of a polyose, it preferably includes both a pyranose structural unit and a furanose structural unit.

The sugar residue of the sugar ester compound may be a pentose-derived one or a hexose-derived one, but is preferably a hexose-derived one.

Preferably, the number of the structural units contained in the sugar ester compound is from 1 to 12, more preferably from 1 to 6, even more preferably 1 or 2.

In the invention, preferably, the sugar ester compound contains from 1 to 12 pyranose structural units or furanose structural units in which at least one hydroxyl group is esterified, even more preferably, one or two pyranose structural units or furanose structural units in which at least one hydroxyl group is esterified.

Examples of monoses or polyoses containing from 2 to 12 monose units include, for example, erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbascose, maltohexaose, α-cyclodextrin, β-cyclodextrin, γ-cyclodextrin, δ-cyclodextrin, xylitol, sorbitol, etc.

Preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, sorbitol; more preferred are arabinose, xylose, glucose, fructose, mannose, galactose, maltose, cellobiose, sucrose, β-cyclodextrin, γ-cyclodextrin; and even more preferred are xylose, glucose, fructose, mannose, galactose, maltose, cellobiose, sucrose, xylitol, sorbitol. The sugar ester compound has a glucose skeleton or a sucrose skeleton, which is described in [0059] in JP-A 2009-1696 as the compound 5 therein. The sugar ester compound of the type is, as compared with the sugar ester compound having a maltose skeleton used in Examples in the patent reference, especially preferred from the viewpoint of the compatibility thereof with polymer.

—Structure of Substituent—

More preferably, the sugar ester compound for use in the invention has, including the substituent therein, a structure represented by the following general formula (1):

$$(OH)_p\text{-}G\text{-}(L^1\text{-}R^{11})_q(O\text{—}R^{12})_r \quad (1)$$

wherein G represents a sugar residue; $L^1$ represents any one of —O—, —CO— or —NR$^{13}$—; $R^{11}$ represents a hydrogen atom or a monovalent substituent; $R^{12}$ represents a monovalent substituent bonding to the formula via an ester bond; p, q and r each independently indicate an integer of 0 or more, and p+q+r is equal to the number of the hydroxyl groups on the presumption that G is an unsubstituted sugar group having a cyclic acetal structure.

The preferred range of G is the same as the preferred range of the above-mentioned sugar residue.

$L^1$ is preferably —O— or —CO—, more preferably —O—. When $L^1$ is —O—, it is more preferably an ether bond or an ester bond-derived linking group, even more preferably an ester bond-derived linking group.

In case where the formula has multiple $L^1$'s, then they may be the same or different.

Preferably, at least one of $R^{11}$ and $R^{12}$ has an aromatic ring.

In particular, in case where $L^1$ is —O— (or that is, in case where the hydroxyl group in the above-mentioned sugar ester compound is substituted with $R^{11}$ and $R^{12}$), preferably, $R^{11}$, $R^{12}$ and $R^{13}$ are selected from a substituted or unsubstituted acyl group, a substituted or unsubstituted aryl group, a substituted or unsubstituted alkyl group, or a substituted or unsubstituted amino group, more preferably from a substituted or unsubstituted acyl group, a substituted or unsubstituted alkyl group, or a substituted or unsubstituted aryl group, even more preferably from an unsubstituted acyl group, a substituted or unsubstituted alkyl group, or an unsubstituted aryl group.

In case where the formula has multiple $R^{11}$'s, $R^{12}$'s and $R^{13}$'s, they may be the same or different.

p is an integer of 0 or more, and its preferred range is the same as the preferred range of the number of the hydroxyl groups per the monose unit to be mentioned below. In the invention, p is preferably 0.

r is preferably a number larger than the number of the pyranose structural units or the furanose structural units contained in G.

q is preferably 0.

p+q+r is equal to the number of the hydroxyl groups on the presumption that G is an unsubstituted sugar group having a cyclic acetal structure, and therefore, the uppermost limit of these p, q and r is specifically defined depending on the structure of G.

Preferred examples of the substituent of the sugar ester compound include an alkyl group (preferably an alkyl group having from 1 to 22 carbon atoms, more preferably from 1 to 12 carbon atoms, even more preferably from 1 to 8 carbon atoms, for example, a methyl group, an ethyl group, a propyl group, a hydroxyethyl group a hydroxypropyl group, a 2-cyanoethyl group, a benzyl group), an aryl group (preferably an aryl group having from 6 to 24 carbon atoms, more preferably from 6 to 18 carbon atoms, even more preferably from 6 to 12 carbon atoms, for example, a phenyl group, a naphthyl group), an acyl group (preferably an acyl group having from 1 to 22 carbon atoms, more preferably from 2 to 12 carbon atoms, even more preferably from 2 to 8 carbon atoms, for example, an acetyl group, a propionyl group, a butyryl group, a pentanoyl group, a hexanoyl group, an octanoyl group, a benzoyl group, a toluoyl group, a phthalyl group), an amide group (preferably an amide group having from 1 to 22 carbon atoms, more preferably from 2 to 12 carbon atoms, even more preferably from 2 to 8 carbon atoms, for example, a formamide group, an acetamide group), an imide group (preferably an imide group having from 4 to 22 carbon atoms, more preferably from 4 to 12 carbon atoms, even more preferably from 4 to 8 carbon atoms, for example, a succinimide group, a phthalimide group), an arylalkyl group (preferably an arylalkyl group having from 7 to 25 carbon atoms, more preferably from 7 to 19 carbon atoms, even more preferably from 7 to 13 carbon atoms, for example, a benzyl group). Of those, more preferred are an alkyl group and an acyl group; and even more preferred are a methyl group, an acetyl group, a benzoyl group and a benzyl group; and especially preferred are an acetyl group and a benzyl group. Especially of those, in case where the constitutive sugar in the sugar ester compound is a sucrose skeleton, preferred are sugar ester compounds having an acetyl group and a benzyl group as the substituents therein, as compared with the sugar ester compound with a benzoyl group described as the compound 3 in [0058] in JP-A 2009-1696 and used in Examples in the patent reference, in point of the compatibility thereof with polymer.

Preferably, the number of the hydroxyl groups per the structural unit in the sugar ester compound (hereinafter this may be referred to as a hydroxyl group content) is at most 3, more preferably at most 1, even more preferably zero (0). Controlling the hydroxyl group content to fall within the range is preferred since the sugar ester compound may be prevented from moving into the adjacent polarizing element layer to break the PVA-iodine complex therein while aged under high temperature and high humidity condition, and therefore the polarizer performance may be prevented from worsening in aging under high temperature and high humidity condition.

Preferably, in the sugar ester compound for use in the film containing an optically-anisotropic layer, an unsubstituted hydroxyl group does not exist and the substituents therein are an acetyl group and/or a benzyl group alone.

Regarding the proportion of the acetyl group and the benzyl group in the sugar ester compound, preferably, the proportion of the benzyl group is smaller in some degree. This is because the wavelength dispersion characteristics of retardation of the cellulose acylate film of the type, ΔRe and ΔRe/Re (550) may increase and, when the film is incorporated in a liquid crystal display device, the color shift at the time of black level of display could be small. Concretely, the ratio of the benzyl group to the sum total of all the unsubstituted hydroxyl groups and all the substituents in the sugar ester compound is preferably at most 60%, more preferably at most 40%.

The sugar ester compounds are available as commercial products such as Tokyo Chemical's ones, Aldrich's ones, etc., or may be produced according to known methods of converting commercially-available carbohydrates into ester derivatives thereof (for example, according to the method described in JP-A 8-245678).

Preferably, the sugar ester compound has a number-average molecular weight of from 200 to 3500, more preferably from 200 to 3000, even more preferably from 250 to 2000.

Specific examples of the sugar ester compounds preferred for use in the invention are mentioned below; however, the invention is not limited to the following embodiments.

In the structural formulae mentioned below, R each independently represents an arbitrary substituent, and plural R's may be the same or different.

TABLE 1

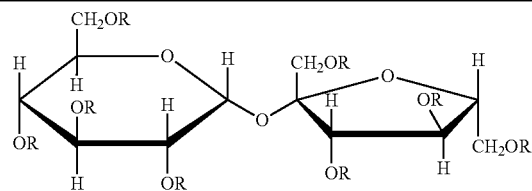

| | Substituent 1 | | Substituent 2 | | |
|---|---|---|---|---|---|
| Compound | type | degree of substitution | type | degree of substitution | Molecular Weight |
| 100 | acetyl | 8 | benzyl | 0 | 679 |
| 101 | acetyl | 7 | benzyl | 1 | 727 |
| 102 | acetyl | 6 | benzyl | 2 | 775 |
| 103 | acetyl | 5 | benzyl | 3 | 817 |
| 104 | acetyl | 0 | benzyl | 8 | 1063 |
| 105 | acetyl | 7 | benzoyl | 1 | 741 |
| 106 | acetyl | 6 | benzoyl | 2 | 802 |
| 107 | benzyl | 2 | no | 0 | 523 |
| 108 | benzyl | 3 | no | 0 | 613 |
| 109 | benzyl | 4 | no | 0 | 702 |
| 110 | acetyl | 7 | phenylacetyl | 1 | 771 |
| 111 | acetyl | 6 | phenylacetyl | 2 | 847 |

TABLE 2

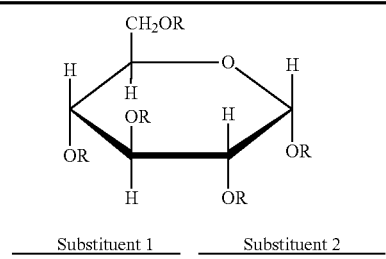

| | Substituent 1 | | Substituent 2 | | |
|---|---|---|---|---|---|
| Compound | type | degree of substitution | type | degree of substitution | Molecular Weight |
| 201 | acetyl | 4 | benzoyl | 1 | 468 |
| 202 | acetyl | 3 | benzoyl | 2 | 514 |
| 203 | acetyl | 2 | benzoyl | 3 | 577 |
| 204 | acetyl | 4 | benzyl | 1 | 454 |
| 205 | acetyl | 3 | benzyl | 2 | 489 |
| 206 | acetyl | 2 | benzyl | 3 | 535 |
| 207 | acetyl | 4 | phenyl-acetyl | 1 | 466 |
| 208 | acetyl | 3 | phenyl-acetyl | 2 | 543 |
| 209 | acetyl | 2 | phenyl-acetyl | 3 | 619 |
| 210 | phenyl-acetyl | 1 | no | 0 | 298 |
| 211 | phenyl-acetyl | 2 | no | 0 | 416 |

TABLE 2-continued

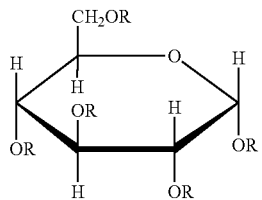

| | Substituent 1 | | Substituent 2 | | |
|---|---|---|---|---|---|
| Compound | type | degree of substitution | type | degree of substitution | Molecular Weight |
| 212 | phenyl-acetyl | 3 | no | 0 | 535 |
| 213 | phenyl-acetyl | 4 | no | 0 | 654 |

TABLE 3

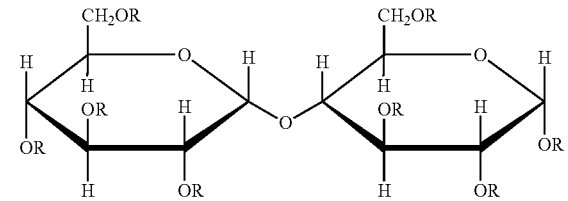

| | Substituent 1 | | Substituent 2 | | |
|---|---|---|---|---|---|
| Compound | type | degree of substitution | type | degree of substitution | Molecular Weight |
| 301 | acetyl | 6 | benzoyl | 2 | 803 |
| 302 | acetyl | 6 | benzyl | 2 | 775 |
| 303 | acetyl | 6 | phenyl-acetyl | 2 | 831 |
| 304 | benzoyl | 2 | no | 0 | 551 |
| 305 | benzyl | 2 | no | 0 | 522 |
| 306 | phenyl-acetyl | 2 | no | 0 | 579 |

TABLE 4

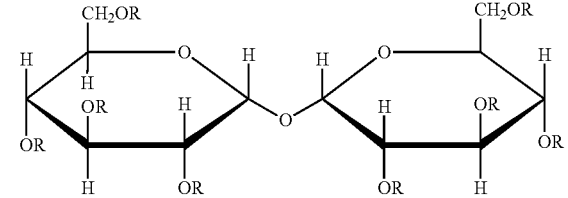

| | Substituent 1 | | Substituent 2 | | |
|---|---|---|---|---|---|
| Compound | type | degree of substitution | type | degree of substitution | Molecular Weight |
| 401 | acetyl | 6 | benzoyl | 2 | 803 |
| 402 | acetyl | 6 | benzyl | 2 | 775 |
| 403 | acetyl | 6 | phenyl-acetyl | 2 | 831 |
| 404 | benzoyl | 2 | no | 0 | 551 |
| 405 | benzyl | 2 | no | 0 | 523 |
| 406 | phenyl ester | 2 | no | 0 | 579 |

Preferably, the film in the invention contains the sugar ester compound in an amount of from 2 to 30% by mass relative to the cellulose acylate therein, more preferably from 5 to 20% by mass, even more preferably from 5 to 15% by mass.

In case where the film contains the after-mentioned additive having a negative intrinsic birefringence along with the sugar ester compound, the amount of the sugar ester compound (part by mass) relative to the amount of the additive having a negative intrinsic birefringence (part by mass) is preferably from 2 to 10 times (ratio by mass), more preferably from 3 to 8 times (ratio by mass).

In case where the film contains the after-mentioned polyester-type plasticizer along with the sugar ester compound, the amount of the sugar ester compound (part by mass) relative to the amount of the polyester-type plasticizer (part by mass) is preferably from 2 to 10 times (ratio by mass), more preferably from 3 to 8 times (ratio by mass).

One or more different types of sugar ester compounds mentioned above may be used in the film in the invention either singly or as combined therein.

(Other Additives)

The film containing an optically-anisotropic layer may contain any other additive capable than the above-mentioned non-phosphate compound, for example, a retardation-controlling agent (retardation enhancer, retardation reducer), a plasticizer such as a phthalate, a phosphate or the like, a UV absorbent, an antioxidant, a mat agent, etc.

(A) Retardation Reducer

As the retardation reducer in the invention, widely employable are phosphate compounds and compounds except non-phosphate compounds known as additives to cellulose acylate film.

The polymer-type retardation reducer usable herein is selected from phosphate-type polyester polymers, styrenic polymers, acrylic polymers and their copolymers; and preferred are acrylic polymers and styrenic polymers. Preferably, the film in the invention contains at least one polymer having an inherent negative birefringence, such as styrenic polymers and acrylic polymers.

The low-molecular retardation reducer that is a compound except non-phosphate compounds includes the following. These may be solid or oily. Briefly, the melting point and the boiling point of the compounds are not specifically defined. For example, there may be mentioned a mixture of UV absorbent materials in which the melting or boiling point of one material is not higher than 20° C. and that of the other is higher than 20° C., and a mixture of degradation inhibitors of the same type as above. IR absorbent dyes usable herein are described, for example, in JP-A 2001-194522. The time when the additive is added may be at any time in the cellulose acylate solution (dope) production step. As the case may be, a step of adding the additive may be additionally provided in the final stage after the dope preparation step. The amount of the material to be added is not specifically defined so far as the material can express its function.

The low-molecular retardation reducer that is a compound except non-phosphate compounds is not specifically defined, and its details are described in JP-A2007-272177, [0066] to [0085].

The compounds represented by the formula (1) in JP-A2007-272177, [0066] to [0085] can be produced according to the following method.

The compound of the formula (1) in the patent publication can be produced through condensation of a sulfonyl chloride derivative and an amine derivative.

The compound represented by the general formula (2) in JP-A 2007-272177 can be produced through dehydrating condensation of a carboxylic acid and an amine using a condensing agent (for example, dicyclohexylcarbodiimide (DCC), etc.), or through substitution reaction of a carboxylic acid chloride derivative and an amine derivative.

The retardation reducer is preferably an Rth reducer from the viewpoint of realizing a favorable Nz factor. The Rth reducer of the retardation reducer includes acrylic polymers and styrenic polymers as well as low-molecular compounds of the formulae (3) to (7) of JP-A 2007-272177. Of those, preferred are acrylic polymers and styrenic polymers, and more preferred are acrylic polymers.

Preferably, the retardation reducer is added in a ratio of from 0.01 to 30% by mass relative to the cellulose resin, more preferably from 0.1 to 20% by mass, even more preferably from 0.1 to 10% by mass.

When the amount is at most 30% by mass, the compatibility of the compound with the cellulose resin can be bettered, and the formed film can be prevented from whitening. In case where two or more different types of retardation reducers are used, preferably, their total amount is within the above range.

(B) Plasticizer:

Many compounds known as plasticizer for cellulose acylate are usable as the plasticizer in the invention. As the plasticizer, usable are phosphates or carboxylates. Examples of the phosphates include triphenyl phosphate (TPP) and tricresyl phosphate (TCP). The carboxylates are typically phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetyl citrate (OACTE) and tributyl O-acetylcitrate (OACTB). Examples of other carboxylates include butyl oleate, methylacetyl ricinoleate, dibutyl sebacate, various trimellitates, etc. The phthalate-type plasticizers (DMP, DEP, DBP, DOP, DPP, DEHP) are preferably used here. DEP and DPP are especially preferred.

(C) Retardation Enhancer:

Preferably, the film containing an optically-anisotropic layer contains at least one retardation enhancer in the low-substitution layer therein for enhancing the retardation thereof. The type of the retardation enhancer is not specifically defined. The retardation enhancer includes rod-shaped compounds or compounds having a cyclic structure such as a cycloalkane or aromatic ring, and the above-mentioned non-phosphate compounds having the ability to enhance retardation. As the cyclic structure-having compounds, preferred are discotic compounds. As the rod-shaped or discotic compounds, compounds having at least two aromatic rings are preferred as the retardation enhancer for use herein.

Preferably, the amount to be added of the retardation enhancer of a rod-shaped compound is from 0.1 to 30 parts by mass relative to 100 parts by mass of the polymer ingredient including cellulose acylate, more preferably from 0.5 to 20 parts by mass. Preferably, the content of the discotic compound contained in the retardation enhancer is less than 3 parts by mass relative to 100 parts by mass of the cellulose acylate, more preferably less than 2 parts by mass, even more preferably less than 1 part by mass.

A discotic compound is more excellent in Rth retardation expressibility than a rod-shaped compound, and is therefore favorably used in a case where an especially large Rth retardation is needed. Two or more different types of retardation enhancers may be used here as combined.

Preferably, the retardation enhancer has a maximum absorption in a wavelength region of from 250 to 400 nm, more preferably substantially not having an absorption in a visible region.

Discotic compounds are described. Discotic compounds having at least two aromatic rings are usable here.

In this description, "aromatic ring" includes not only an aromatic hydrocarbon ring but also an aromatic hetero ring.

The aromatic hydrocarbon ring is especially preferably a 6-membered ring (or that is, benzene ring).

The aromatic hetero ring is generally an unsaturated hetero ring. The aromatic hetero ring is preferably a 5-membered ring, a 6-membered ring or a 7-membered ring, and more preferably a 5-membered ring or a 6-membered ring. The aromatic hetero ring generally has a largest number of double bonds. As the hetero atom, preferred are a nitrogen atom, an oxygen atom and a sulfur atom, and more preferred is a nitrogen atom. Examples of the aromatic hetero ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring.

As the aromatic ring, preferred are a benzene ring, a condensed benzene ring and biphenyls. Especially preferred is a 1,3,5-triazine ring. Concretely, for example, use of the compounds disclosed in JP-A 2001-166144 is preferred here.

Preferably, the carbon number of the aromatic ring that the retardation enhancer has is from 2 to 20, more preferably from 2 to 12, even more preferably from 2 to 8, most preferably from 2 to 6.

The bonding mode of two aromatic rings in the retardation enhancer includes (a) a case of forming a condensed ring, (b) a case of direct bonding via a single bond, and (c) a case of bonding via a linking group (aromatic rings could not form a spiro bond). Any of those bonding modes (a) to (c) is employable here.

Examples of condensed ring of the case (a) (condensed rings of two or more aromatic rings) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolidine rind, a benzoxazole ring, a benzothiazole ring, a benzimidazole ring, a benzotriazole ring, a purine ring, a indazole ring, a chromene ring, a quinoline ring, an isoquinoline ring, a quinolidine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxathine ring, phenoxazine ring and a thianthrene ring. Preferred are a naphthalene ring, an azulene ring, an indole ring, a benzoxazole ring, a benzothiazole ring, a benzimidazole ring, a benzotriazole ring and a quinoline ring.

The single bond in (b) is preferably a bond between the carbon atoms of two aromatic rings. Two aromatic rings may be bonded via 2 or more single bonds, thereby forming an aliphatic ring or a non-aromatic hetero ring between the two aromatic rings.

Also preferably, the linking group in (c) is to link the carbon atoms of two aromatic rings. The linking group is preferably an alkylene group, an alkenylene group, an alkynylene group, —CO—, —O—, —NH—, —S— or a combination thereof. Examples of the linking group comprising a combination of the above groups are shown below. Regarding the relationship therebetween, the right side and the left side groups in the examples of linking groups mentioned below may be reversed to each other.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO-O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have a substituent.

Examples of the substituent include a halogen atom (F, Cl, Br, I), a hydroxyl group, a carboxyl group, a cyano group, an amino group, a nitro group, a sulfo group, a carbamoyl group, a sulfamoyl group, an ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group and a non-aromatic heterocyclic group.

Preferably, the carbon number of the alkyl group is from 1 to 8. As the alkyl group, preferred is a chain-like alkyl group rather than a cyclic alkyl group, and more preferred is a linear alkyl group. The alkyl group may be further substituted (for example, with a hydroxy group, a carboxyl group, an alkoxy group, or an alkyl-substituted amino group). Examples of the alkyl group (including substituted alkyl group) include a methyl group, an ethyl group, an n-butyl group, an n-hexyl group, a 2-hydroxyethyl group, a 4-carboxybutyl group, a 2-methoxyethyl group and a 2-diethylaminoethyl group.

Preferably, the carbon number of the alkenyl group is from 2 to 8. As the alkenyl group, preferred is a chain-like alkenyl group rather than a cyclic alkenyl group, and more preferred is a linear alkenyl group. The alkenyl group may be further substituted. Examples of the alkenyl group include a vinyl group, an allyl group and a 1-hexenyl group.

Preferably, the carbon number of the alkynyl group is from 2 to 8. As the alkynyl group, preferred is a chain-like alkynyl group rather than a cyclic alkynyl group, and more preferred is a linear alkynyl group. The alkynyl group may be further substituted. Examples of the alkynyl group include an ethynyl group, a 1-butynyl group and a 1-hexynyl group.

Preferably, the carbon number of the aliphatic acyl group is from 1 to 10. Examples of the aliphatic acyl group include an acetyl group, a propanoyl group and a butanoyl group.

Preferably, the carbon number of the aliphatic acyloxy group is from 1 to 10. Examples of the aliphatic acyloxy group include an acetoxy group.

Preferably, the carbon number of the alkoxy group is from 1 to 8. The alkoxy group may be further substituted (for example, with an alkoxy group). Examples of the alkoxy group (including substituted alkoxy group) include a methoxy group, an ethoxy group, a butoxy group and a methoxyethoxy group.

Preferably, the carbon number of the alkoxycarbonyl group is from 2 to 10. Examples of the alkoxycarbonyl group include a methoxycarbonyl group and an ethoxycarbonyl group.

Preferably, the carbon number of the alkoxycarbonylamino group is from 2 to 10. Examples of the alkoxycarbonylamino group include a methoxycarbonylamino group and an ethoxycarbonylamino group.

Preferably, the carbon number of the alkylthio group is from 1 to 12. Examples of the alkylthio group include a methylthio group, an ethylthio group and an octylthio group.

Preferably, the carbon number of the alkylsulfonyl group is from 1 to 8. Examples of the alkylsulfonyl group include a methanesulfonyl group and an ethanesulfonyl group.

Preferably, the carbon number of the aliphatic amide group is from 1 to 10. Examples of the aliphatic amide group include an acetamide group.

Preferably, the carbon number of the aliphatic sulfonamide group is from 1 to 8. Examples of the aliphatic sulfonamide group include a methanesulfonamide group, a butanesulfonamide group and an n-octanesulfonamide group.

Preferably, the carbon number of the aliphatic substituted amino group is from 1 to 10. Examples of the aliphatic substituted amino group include a dimethylamino group, a diethylamino group and a 2-carboxyethylamino group.

Preferably, the carbon number of the aliphatic substituted carbamoyl group is from 2 to 10. Examples of the aliphatic substituted carbamoyl group include a methylcarbamoyl group and a diethylcarbamoyl group.

Preferably, the carbon number of the aliphatic substituted sulfamoyl group is from 1 to 8. Examples of the aliphatic substituted sulfamoyl group include a methylsulfamoyl group and a diethylsulfamoyl group.

Preferably, the carbon number of the aliphatic substituted ureido group is from 2 to 10. Examples of the aliphatic substituted ureido group include a methylureido group.

Examples of the non-aromatic heterocyclic group include a piperidino group and a morpholino group.

Preferably, the molecular weight of the retardation enhancer is from 300 to 800.

In the invention, as the discotic compound, preferred is use of triazine compounds represented by the following general formula (I):

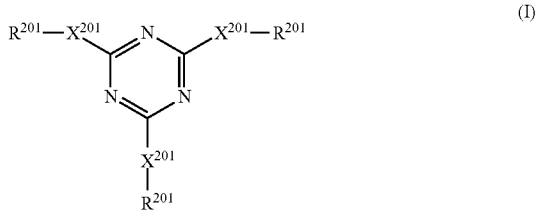

In the above formula (I), $R^{201}$ each independently represents an aromatic ring or a hetero ring having a substituent at any of ortho-, meta- and para-positions.

$X^{201}$ each independently represents a single bond or —$NR^{202}$—. In this, $R^{202}$ each independently represent a hydrogen atom, or a substituted or unsubstituted alkyl, alkenyl, aryl or heterocyclic group.

Preferably, the aromatic ring represented by $R^{201}$ is phenyl or naphthyl, more preferably phenyl. The aromatic ring represented by $R^{201}$ is may have at least one substituent at any substitution position thereof. Examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamide group, a carbamoyl group, an alkyl-substituted carbamoyl group, an alkenyl-substituted carbamoyl group, an aryl-substituted carbamoyl group, an amide group, an alkylthio group, an alkenylthio group, an arylthio group and an acyl group.

The heterocyclic group represented by $R^{201}$ is preferably aromatic. The aromatic hetero ring is generally an unsaturated hetero ring and is preferably a hetero ring having a largest number of double bonds. Preferably, the hetero ring is a 5-membered ring, a 6-membered ring or a 7-membered ring, more preferably a 5-membered ring or a 6-membered ring, most preferably a 6-membered ring. Preferably, the hetero atom of the hetero ring is a nitrogen atom, a sulfur atom or an oxygen atom, more preferably a nitrogen atom. As the aromatic hetero ring, especially preferred is a pyridine ring (as the heterocyclic group thereof, 2-pyridyl or 4-pyridyl). The heterocyclic group may have a substituent. Examples of the substituent of the heterocyclic group are the same as those of the substituent of the above-mentioned aryl moiety.

The heterocyclic group in a case where $X^{201}$ is a single bond is preferably a heterocyclic group having a free atomic valence at the nitrogen atom thereof. The heterocyclic group having a free atomic valence at the nitrogen atom thereof is preferably a 5-membered ring, a 6-membered ring or a 7-membered ring, more preferably a 5-membered ring or a 6-membered ring, most preferably a 5-membered ring. The heterocyclic group may have multiple nitrogen atoms. The heterocyclic group may have any other hetero atom (e.g., O, S) than the nitrogen atom. Examples of the heterocyclic group having a free atomic valence at the nitrogen atom thereof are mentioned below. In these, —$C_4H_9{}^n$ means n-$C_4H_9$.

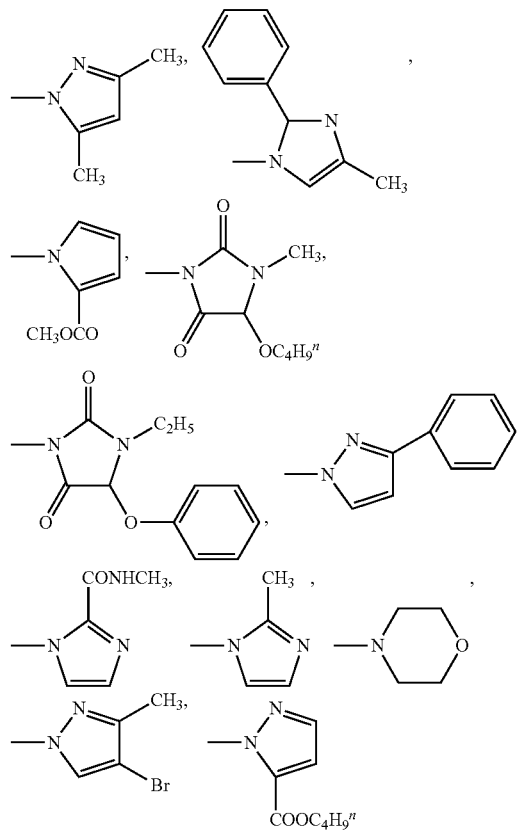

The alkyl group represented by $R^{202}$ may be a cyclic alkyl group or a chain-like alkyl group, but is preferably a chain-like alkyl group, more preferably a linear alkyl group rather than a branched chain-like alkyl group. The carbon number of the alkyl group is preferably from 1 to 30, more preferably from 1 to 20, even more preferably from 1 to 10, still more preferably from 1 to 8, most preferably from 1 to 6. The alkyl group may have a substituent. Examples of the substituent include a halogen atom, an alkoxy group (for example, methoxy group, ethoxy group) and an acyloxy group (for example, acryloyloxy group, methacryloyloxy group).

The alkenyl group represented by $R^{202}$ may be a cyclic alkenyl group or a chain-like alkenyl group, but is preferably a chain-like alkenyl group, more preferably a linear alkenyl group rather than a branched chain-like alkenyl group. The carbon number of the alkenyl group is preferably from 2 to 30, more preferably from 2 to 20, even more preferably from 2 to 10, still more preferably from 2 to 8, most preferably from 2 to 6. The alkenyl group may have a substituent. Examples of the substituent are the same as those of the substituent of the alkyl group mentioned above.

The aromatic cyclic group and the heterocyclic group represented by $R^{202}$ are the same as the aromatic ring and the hetero ring represented by $R^{201}$, and preferred examples of the former are also the same as those of the latter. The aromatic cyclic group and the heterocyclic group may be further substituted, and examples of the substituent for these are the same as those of the substituent for the aromatic cyclic group and the heterocyclic group of $R^{201}$.

The compounds represented by the general formula (1) may be produced in any known methods, for example, according to the method described in JP-A 2003-344655, etc. The details of the retardation enhancer are described in Disclosure Bulletin No. 2001-1745, p. 49.

As the retardation enhancer for use in the film containing an optically-anisotropic layer, a polymer additive may also be used like the above-mentioned low-molecular compound. In the invention, the polymer used as the above-mentioned non-phosphate polymer can additionally have the function of a retardation enhancer. As the polymer retardation enhancer of the non-phosphate polymer, preferred are the above-mentioned aromatic polyester polymer and a copolymer of the above-mentioned aromatic polyester polymer with any other resin.

The retardation enhancer to be used in the film containing an optically-anisotropic layer is more preferably an Re enhancer from the viewpoint of efficiently enhancing Re and realizing a suitable Nz factor. As the Re enhancer of the above-mentioned retardation enhancer, for example, there are mentioned discotic compounds and rod-shaped compounds.

In the invention, if desired, an anti-aging agent, a UV absorbent, a release promoter, a mat agent, a lubricant, the above-mentioned plasticizer and the like may be suitably used.

(D) Antioxidant

In the invention, the cellulose acylate solution may contain a known antioxidant, for example, a phenolic or hydroquinone-type antioxidant such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, pentaerythrityl tetrakis[3-(3,5-di-tert-butyl-4-hydroxyphenyl)propionate] or the like may be added to the cellulose acylate solution. Preferred is use of a phosphate-type antioxidant such as tris(4-methoxy-3,5-diphenyl) phosphite, tris (nonylphenyl) phosphite, tris(2,4-di-tert-butylphenyl) phosphite, bis(2,6-di-tert-butyl-4-methylphenyl)pentaerythritol diphosphite, bis(2,4-di-tert-butylphenyl)pentaerythritol diphosphite, etc. Preferably, the amount of the antioxidant to be added is from 0.05 to 5.0 parts by mass relative to 100 parts by mass of the cellulose resin.

(E) UV Absorbent

In the invention, the cellulose acylate solution may contain a UV absorbent from the viewpoint of preventing the degradation of polarizer, liquid crystal, etc. As the UV absorbent, preferred are those excellent in UV absorbability at a wavelength of 370 nm or less and poorly absorbing visible light having a wavelength of 400 nm or more, from the viewpoint of securing good liquid crystal display performance. Specific examples of the UV absorbent preferred for use in the invention include, for example, hindered phenolic compounds, hydroxybenzophenone compounds, benzotriazole compounds, salicylate compounds, benzophenone compounds, cyanoacrylate compounds, nickel complex compounds, etc. Examples of the hindered phenolic compounds include 2,6-di-tert-butyl-p-cresol, pentaerythrityl tetrakis[3-(3,5-di-tert-butyl-4-hydroxyphenyl) propionate], N,N'-hexamethylenebis(3,5-di-tert-butyl-4-hydroxy-hydrocinn amide), 1,3,5-trimethyl-2,4,6-tris(3,5-di-tert-butyl-4-hydroxybenzyl) benzene, tris-(3,5-di-tert-butyl-4-hydroxybenzyl) isocyanurate, etc. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinn amide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol, pentaerythrityl tetrakis[3-(3,5-di-tert-butyl-4-hydroxyphenyl)propionate], etc. The amount of the UV inhibitor is preferably from 1 ppm to 1.0% by mass in the entire optical film, more preferably from 10 to 1000 ppm.

(F) Release Promoter:

Preferably, a release promoter is added to the film containing an optically-anisotropic layer from the viewpoint of enhancing the releasability of the film. The release promoter may be added thereto, for example, in a ratio of from 0.001 to 1% by weight. The amount thereof of at most 0.5% by weight is preferred since the release promoter hardly separates from the film; and the amount thereof of at least 0.005% by weight is preferred since the release promoter can exhibit the intended releasing effect thereof. Accordingly, the amount of the release promoter in the film is preferably from 0.005 to 0.5% by weight, more preferably from 0.01 to 0.3% by weight. As the release promoter, herein employable are any known ones such as organic or inorganic acid compounds, surfactants, chelating agents, etc. Above all, polycarboxylic acids and their esters are effective, and in particular, ethyl citrate is more effective.

Preferably, the release promoter is added to the after-mentioned skin B layer in the film containing an optically-anisotropic layer.

(G) Mat Agent:

Preferably, at least one high-substitution layer in the film containing an optically-anisotropic layer contains a mat agent from the viewpoint of securing film slidability and stable film production. The mat agent may be a mage agent of an inorganic compound or a mat agent of an organic compound.

Preferred examples of the matting agent of an inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin-antimony oxide, calcium carbonate, talc, clay, calcined kaolin, calcium phosphate, etc. More preferred are silicon-containing inorganic compounds and zirconium oxide. Particularly preferred is silicon dioxide since it can reduce the haze of cellulose acylate films. As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Preferred examples of the matting agent of an organic compound include polymers such as silicone resins, fluororesins, acrylic resins, etc. Above all, more preferred are silicone resins. Of silicone resins, even more preferred are those having a three-dimensional network structure. For example, usable are commercial products of Tospearl 103, Tospearl 105, Tospearl 18, Tospearl 120, Tospearl 145, Tospearl 3120 and Tospearl 240 (all trade names by Toshiba Silicone), etc.

When the matting agent is added to a cellulose acylate solution, any method is employable with no problem, as long as it can produce a desired cellulose acylate solution. For example, the additive may be added in the stage where a cellulose acylate is mixed with a solvent; or the additive may be added to a mixture solution prepared from a cellulose acylate and a solvent. Further, the additive may be added to and mixed with a dope just before the dope is cast, and this is a so-called direct addition method, in which the ingredients may be on-line mixed by screw kneading. Concretely, preferred is a static mixer such as an in-line mixer. As the in-line mixer, for example, preferred is a static mixer, SWJ (Toray's static tubular mixer, Hi-Mixer, by Toray Engineering). Regarding the mode of in-line addition, JP-A 2003-053752 describes an invention of a method for producing a cellulose acylate film wherein, for the purpose of preventing concentration unevenness and particle aggregation, the distance L between the nozzle tip through which an additive liquid having a composition differing from that of the main material dope and the start end of an in-line mixer is controlled to be at most 5 times the inner diameter d of the main material feeding line, thereby preventing concentration unevenness and aggregation of matting particles, etc. The patent reference discloses a more preferred embodiment, in which the distance (L) between the nozzle tip opening through which an additive liquid having a composition differing from that of the main material dope and the start end of the in-line mixer is controlled to be at most 10 times the inner diameter (d) of the feeding nozzle tip opening, and the in-line mixer is a static non-stirring tubular mixer or a dynamic stirring tubular mixer. More concretely, the patent reference discloses that the flow ratio of the cellulose acylate film main material dope/in-line additive liquid is from 10/1 to 500/1, more preferably from 50/1 to 200/1. JP-A 2003-014933 discloses an invention of providing a retardation film which is free from a trouble of additive bleeding and a trouble of interlayer peeling and which has good lubricity and excellent transparency; and regarding the method of adding additives to the film, the patent reference says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

In case where the film containing an optically-anisotropic layer has a configuration of skin B layer/core layer/skin A layer, preferably, at least one of the skin A layer and the skin B layer of the film containing an optically-anisotropic layer contains a mat agent from the viewpoint of enhancing the abrasion resistance of the film owing to reducing the friction coefficient of the film surface and from the viewpoint of preventing the film from grating or folding when the film is wide and when such a wide film is wound up. More preferably, the mat agent is added to both the skin A layer and the skin B layer from the viewpoint of more effectively enhancing the abrasion resistance of the film and preventing the film from grating.

Regarding the amount of the mat agent to be added to the film containing an optically-anisotropic layer, unless the amount is too much, then the haze of the film does not increase. In fact, when the film is used in LCD, the mat agent therein causes little inconvenience such as contrast reduction or bright spot generation. Unless the amount thereof is too small, the mat agent realizes preventing the grating and enhancing the abrasion resistance. From these viewpoints, the ratio of the mat agent to be contained in the film is preferably from 0.01 to 5.0% by weight, more preferably from 0.03 to 3.0% by weight, even more preferably from 0.05 to 1.0% by weight.

(Characteristics of Optically-Anisotropic Layer-Containing Film)

In the invention, the optically-anisotropic layer-containing film is characterized by satisfying the following formula (1-2).

$$1\ \mathrm{nm} < Re(630) - Re(440) \leq 12\ \mathrm{nm} \tag{1-2}$$

In the formula (1-2), $Re(630)$ means the in-plane retardation of the film at a wavelength of 630 nm, and $Re(440)$ means the in-plane retardation thereof at a wavelength of 440 nm.

The value of $Re(630)-Re(440)$ is more preferably from 2 to 12 nm, even more preferably from 3 to 10 nm, still more preferably from 3 to 4 nm.

More preferably in the invention, the film containing an optically-anisotropic layer satisfies the following formula (2).

$$3\ \mathrm{nm} \leq Rth(630) - Rth(440) \leq 28\ \mathrm{nm} \tag{2}$$

In the formula (2), $Rth(630)$ means the thickness-direction retardation of the film at a wavelength of 630 nm, and $Rth(440)$ means the thickness-direction retardation thereof at a wavelength of 440 nm.

More preferably, the value of $Rth(630)-Rth(440)$ is from 3 to 20 nm, even more preferably from 3 to 10 nm.

Of the film containing an optically-anisotropic layer, the in-plane retardation at a wavelength of 550 nm, $Re(550)$ is comparable to or more than the in-plane retardation at a wavelength of 440 nm, $Re(440)$ thereof, but preferably the former is more than the latter. The film containing an optically-anisotropic layer has the wavelength dispersion characteristics of retardation, and therefore, when the film is incorporated in a liquid crystal display device, then the device can solve the problem of color shift in watching it in oblique directions at the time of black level of display.

Of the film containing an optically-anisotropic layer, preferably, the thickness-direction retardation at a wavelength of 550 nm, $Rth(550)$ is comparable to or more than the thickness-direction retardation at a wavelength of 440 nm, $Rth(440)$ thereof from the viewpoint of surely solving the problem of color shift, and more preferably, the former is more than the latter from the viewpoint of more surely solving the problem of color shift.

Preferably, the film containing an optically-anisotropic layer is a biaxial optical compensatory film.

The biaxial optical compensatory film means that nx, ny and nz of the optical compensatory film all differ from each other (where nx means the refractive index in the in-plane slow axis direction, ny means the refractive index in the in-plane direction perpendicular to nx, and nz means the refractive index in the direction perpendicular to nx and ny), and in the invention, more preferably, nx>ny>nz.

The film containing an optically-anisotropic layer of the invention, which has the biaxial optical property, is preferred in that, when it is incorporated in a liquid crystal display device, especially in a VA-mode liquid crystal display device and when the device is watched in oblique directions, the device can solve the problem of color shift.

Preferably, the wavelength dispersion of the in-plane retardation Re and the thickness-direction retardation Rth of the film containing an optically-anisotropic layer is larger at a longer wavelength range in a visible light region.

In this, the light in a visible light region is concretely one having a wavelength of from 380 to 780 nm; and at a longer wavelength, the values of Re and Rth of the film are preferably larger.

Using the film of the type in the liquid crystal display device of the invention further reduces the color shift in watching the device in oblique direction.

In case where the film containing an optically-anisotropic layer is used as a retardation film, Re(550) and Rth (550) thereof can be suitably selected depending on the design of the liquid crystal cell and that of the optical film. At a wavelength of 550 nm, the in-plane retardation Re is preferably 25 nm≤|Re(550)|≤100 nm, more preferably 30 nm≤|Re(550)|≤80 nm, even more preferably 35 nm≤|Re(550)|≤70 nm.

Also preferably, the film containing an optically-anisotropic layer in the polarizer in the invention satisfies the following formula (3).

$$45 \text{ nm} \leq Re(550) \leq 60 \text{ nm} \quad (3)$$

In the formula (3), Re(550) means the in-plane retardation of the film at a wavelength of 550 nm.

Preferably, the thickness-direction retardation Rth of the film containing an optically-anisotropic layer is 50 nm≤|Rth (550)|≤250 nm, from the viewpoint of using the film as a retardation film for optical compensation in a liquid crystal display device. More preferably, Rth(550) is 70 nm≤|Rth (550)|≤240 nm, even more preferably 90 nm≤|Rth(550)≤|200 nm.

In this description, Re(λ) and Rth(λ) each mean the in-plane retardation and the thickness-direction retardation, respectively, of a film at a wavelength of λ. Unless otherwise specifically indicated in this description, the wavelength λ, is 550 nm. Re(λ) is measured by applying a light having a wavelength of λ nm to a film sample in the normal direction of the film, using KOBRA 21ADH (by Oji Scientific Instruments). Rth(λ) is determined as follows: With the in-plane slow axis (determined by KOBRA 21ADH) taken as the tilt axis (rotation axis) of the film (in case where the film has no slow axis, the rotation axis of the film may be in any in-plane direction of the film), Re(λ) of the film is measured at 6 points in all thereof, from the normal direction of the film up to 50 degrees on one side relative to the normal direction thereof at intervals of 10°, by applying a light having a wavelength of λ nm from the tilted direction of the film. Based on the thus-determined retardation data of Re(λ), the assumptive mean refractive index and the inputted film thickness, Rth(λ) of the film is computed with KOBRA 21ADH. Apart from this, Re(λ) may also be measured as follows: With the slow axis taken as the tilt axis (rotation axis) of the film (in case where the film has no slow axis, the rotation axis of the film may be in any in-plane direction of the film), the retardation is measured in any desired two directions, and based on the thus-determined retardation data, the assumptive mean refractive index and the inputted film thickness, Rth is computed according to the following formulae (A) and (B). In this, for the assumptive mean refractive index, referred to are the data in Polymer Handbook (John Wiley & Sons, Inc.) or the data in the catalogues of various optical films. Films of which the mean refractive index is unknown may be analyzed with an Abbe's refractiometer to measure the mean refractive index thereof. Data of the mean refractive index of some typical optical films are mentioned below. Cellulose acylate (1.48), cycloolefin polymer (1.52), polycarbonate (1.59), polymethyl methacrylate (1.49), polystyrene (1.59). With the assumptive mean refractive index and the film thickness inputted thereinto, KOBRA 21ADH can compute nx, ny and nz. From the thus-computed data nx, ny and nz, Nz=(nx−nz)/(nx−ny) is induced.

$$Re(\theta) = \left[ nx - \frac{ny \times nz}{\left( \sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2} \right)} \right] \times \frac{d}{\cos\left\{\sin^{-1}\left(\frac{\sin(-\theta)}{nx}\right)\right\}} \quad (A)$$

In this, Re(θ) means the retardation of the film in the direction tilted by an angle θ from the normal direction to the film; nx, ny and nz each mean the refractive index in each main axis direction of an index ellipsoid; and d means the thickness of the film.

$$Rth=((nx+ny)/2-nz)\times d \quad (B)$$

In this, the mean refractive index n is needed as the parameter, for which used are the data measured with an Abbe's refractiometer (Atago's "Abbe Refractometer 2-T").

In general, the Nz factor, as represented by the following formula (C), of the film containing an optically-anisotropic layer is preferably at most 7, more preferably at most 5.5, even more preferably at most 4.5. In this, the Nz factor is suitably selected by planning of liquid crystal cell, optical film, etc. A preferred embodiment of the film containing an optically-anisotropic layer is characterized in that the film can satisfy both enhanced wavelength dispersion characteristics and reduced haze even though the Nz factor thereof is low.

$$Nz \text{ factor}=Rth/Re+0.5 \quad (C)$$

Preferably, the haze of the film containing an optically-anisotropic layer is at most 0.5%, more preferably at most 0.4%, even more preferably at most 0.3%, still more preferably at most 0.2%. When the haze thereof is at most 0.2% and when the film is incorporated in a liquid crystal display device, the contrast ratio of the display panel can be readily increased. In addition, the film transparency could be increased, and another advantage of the film is that it can be more easily used as an optical film.

(Layer Configuration of Optically-Anisotropic Layer-Containing Film)

Preferably, the film containing an optically-anisotropic layer comprises a low-substitution layer that contains a cellulose acylate satisfying the above-mentioned formula (101) and a non-phosphate compound, and, as laminated on at least one side of the low-substitution layer, a high-substitution layer that contains a cellulose acylate satisfying the above-mentioned formula (102). In each layer, the cellulose acylate may have a uniform degree of substitution with an acyl group, or multiple cellulose acylates may be mixed in one layer; but preferably, the degree of substitution with an acyl group of the cellulose acylate in each layer is all constant from the viewpoint of controlling the optical characteristics of the film.

Also preferably, in the film containing an optically-anisotropic layer, the layer kept in contact with the support in producing the film through solution-casting (hereinafter this is referred to as skin B layer) is the above-mentioned high-substitution layer, and the other layer is the above-mentioned low-substitution layer from the viewpoint of further enhancing the releasability of the film from the support in solution-casting film formation.

Preferably, the film containing an optically-anisotropic layer has a three-layer or more multi-layer laminate structure from the viewpoint of securing the dimensional stability thereof and of protecting the film from curling in environmental heat and humidity fluctuation. Preferably, the film have the high-substitution layer on both sides of the low-substitution layer therein, from the viewpoint of increasing the latitude in the process of realizing the desired optical characteristics as optical compensation film. More preferably, the film containing an optically-anisotropic layer has a three-layer or more multi-layer structure, in which all the cellulose contained in at least one inner layer is a cellulose acylate satisfying the above-mentioned formulae (103) and (104), and all the cellulose acylate contained in the surface layer on both sides is a cellulose acylate satisfying the above-mentioned formulae (105) and (106). In the case where the film containing an optically-anisotropic layer has a three-layer or more multilayer laminate structure, the surface layer on the side not kept in contact with the support in film formation is called a skin A layer.

Preferably, the film containing an optically-anisotropic layer has a three-layer configuration of skin B layer/core layer/skin A layer. In case where the film containing an optically-anisotropic layer has a three-layer configuration, the configuration may be either high-substitution layer/low-substitution layer/high-substitution layer, or low-substitution layer/high-substitution layer/low-substitution layer, but is preferably high-substitution layer/low-substitution layer/high-substitution layer from the viewpoint of improving the releasability of the film from the support in solution-casting film formation and from the viewpoint of securing the dimensional stability thereof.

In case where the film containing an optically-anisotropic layer has a three-layer configuration, preferably, the cellulose acylate contained in both surface layers has the same degree of acyl substitution from the viewpoint of the production cost and the dimensional stability of the film and of protecting the film from curling in environmental heat and humidity fluctuation.

Preferably, the mean thickness of the low-substitution layer in the film containing an optically-anisotropic layer is from 30 to 100 µm, more preferably from 30 to 80 µm, even more preferably from 30 to 70 µm. The film having a thickness of at least 30 µm is preferred since the handlability in producing the web of the film is better; and the film having a thickness of at most 70 µm is also preferred since the film is resistant to environmental humidity change and well maintains the optical characteristics thereof.

In the film containing an optically-anisotropic layer, preferably, the mean thickness of at least one high-substitution layer is from 0.2% to less than 25% of the mean thickness of the low-substitution layer therein. When it is at least 0.2%, then the releasability of the film is good and therefore the film is free from uneven streaks and free from thickness unevenness and can be prevented from having uneven optical characteristics; and when less than 25%, then the optical expressibility of the core layer can be effectively utilized and the laminate film secures sufficient optical characteristics. Falling within the range, the film is therefore favorable from these viewpoints. More preferably, the mean thickness of at least one high-substitution layer in the film is from 0.5 to 15% of the mean thickness of the low-substitution layer therein, even more preferably from 1.0 to 10%. Also preferably, the mean thickness of both the skin A layer and the skin B layer is from 0.2% to less than 25% of the mean thickness of the core layer.

In the film containing an optically-anisotropic layer, preferably, the mean thickness of the low-substitution layer is from 30 to 100 µm, and the mean thickness of at least one high-substitution layer therein is from 0.2% to less than 25% of the mean thickness of the low-substitution layer, from the viewpoint of the wavelength dispersion characteristics of retardation of the film. More preferably, the mean thickness of the low-substitution layer is from 30 to 100 µm, and the mean thickness of both the high-substitution layers therein is from 0.2% to less than 25% of the mean thickness of the low-substitution layer.

In case where the film containing an optically-anisotropic layer has a laminate structure of three or more layers, preferably, the thickness of the low-substitution layer (preferably, the core layer) is from 30 to 70 µm, more preferably from 30 to 60 µm, even more preferably from 30 to 50 µm.

In case where the film containing an optically-anisotropic layer has a laminate structure of three or more layers, preferably, the thickness of the high-substitution layer (preferably, the surface layer of both sides of the film) is both from 0.5 to 20 µm, more preferably from 0.5 to 10 µm, even more preferably from 0.5 to 3 µm.

The film containing an optically-anisotropic layer may have a laminate structure of three layers in which the inner layer (core layer) is the above-mentioned low-substitution layer and the surface layers (skin B layer and skin A layer) each are the above-mentioned high-substitution layer. Preferably, the skin B layer and the skin A layer are thinner than the core layer. The preferred condition of the thickness of the surface layer is the same as in the above-mentioned case where the film containing an optically-anisotropic layer has a laminate structure of three or more layers.

Preferably, the width of the film containing an optically-anisotropic layer is from 700 to 3000 mm, more preferably from 1000 to 2800 mm, even more preferably from 1500 to 2500 mm.

Preferably, the width of the film containing an optically-anisotropic layer is from 700 to 3000 mm and ΔRe thereof is at most 10 nm.

(Method for Producing Optically-Anisotropic Layer-Containing Film)

Preferably, the cellulose acylate laminate film for the film containing an optically-anisotropic layer is produced according to a method that comprises a step of successively casting or simultaneously co-casting a cellulose acylate solution for a low-substitution layer that contains a cellulose acylate satisfying the following formula (101) and a non-phosphate compound, and a cellulose acylate solution for a high-substitution layer that contains a cellulose acylate satisfying the following formula (102), thereby preparing a cellulose acylate laminate film, and a step of stretching the cellulose acylate laminate film at a temperature of not lower than Tg −30° C. while the film is in a state containing the residual solvent therein in an amount of at least 5% by mass of the mass of the entire film (wherein Tg means the glass transition temperature of the cellulose acylate laminate film).

$$2.0 < Z1 < 2.7 \quad (101)$$

In the formula (101), Z1 represents the total degree of acyl substitution of the cellulose acylate of the low-substitution layer.

$$2.7 < Z2 \quad (102)$$

In the formula (102), Z2 represents the total degree of acyl substitution of the cellulose acylate of the high-substitution layer.

The production method for the film containing an optically-anisotropic layer is described in detail hereinunder.

Preferably, the cellulose acylate laminate film is produced according to a solvent casting method. For production examples of cellulose acylate film according to a solvent casting method, referred to are U.S. Pat. Nos. 2,336,310, 2,367,603, 2,492,078, 2,492,977, 2,492,978, 2,607,704, 2,739,069, 2,739,070; British Patent 640731, 736892; JP-B 45-4554, 49-5614; JP-A 60-176834, 60-203430, 62-115035, etc. The cellulose acylate film may be stretched. For the method of stretching treatment and the condition thereof, referred to are, for example, JP-A 62-115035, 4-152125, 4-284211, 4-298310, 11-48271, etc.

The solution casting method includes a method of extruding a prepared dope uniformly onto a metal support through a pressure die; a doctor blade method in which the dope once cast onto a metal support is leveled with a blade to control the thickness of the formed film; a method of using a reverse roll coater in which the film thickness is controlled by the reversely-rotating roll, etc. Preferred is the method of using a pressure die. The pressure die includes a coat-hanger type die, a T-die, etc., any of which is favorably usable here. Apart from the methods described herein, any other various types of known methods for producing films by casting cellulose triacetate solution are employable here. In consideration of the difference in the boiling point of the solvents used, the casting condition may be settled, and the same effects as those described in the related patent publications can also be obtained here.

The film containing an optically-anisotropic layer can be produced according to a process that includes a step of casting a cellulose acylate solution (casting dope) for the low-substitution layer that contains a cellulose acylate satisfying the above-mentioned formula (101) and a non-phosphate compound, and a cellulose acylate solution for the high-substitution layer that contains a cellulose acylate satisfying the above-mentioned formula (102), onto a support, and a step of stretching the film formed thereon.

In the production method for the film containing an optically-anisotropic layer, preferably, the viscosity at 25° C. of the cellulose acylate solution for the low-substitution layer is higher by at least 10% than the viscosity at 25° C. of the cellulose acylate solution for the high-substitution layer, from the viewpoint of the width-direction distribution of the laminate film layers and of the production aptitude of the laminate film.

In producing the film containing an optically-anisotropic layer, preferably used is a lamination casting method such as a co-casting method, a successive casting method, a coating method, etc. More preferred is a simultaneous co-casting method from the viewpoint of stable production and production cost reduction.

In case where the film is produced according to a co-casting method or a successive casting method, first prepared is the cellulose acetate solution (dope) for each layer. In the co-casting method (multilayer simultaneous casting method), the co-casting dopes are simultaneously extruded out through a casting Giesser through which the individual casting dopes for the intended layers (the layers may be three or more layers) are simultaneously cast via different slits onto a casting support (band or drum), and at a suitable time, the film formed on the metal support is peeled away and dried.

The successive-casting method is as follows: First the casting dope for the first layer is extruded out and cast onto a casting support through a casting Giesser, then after it is dried or not dried, the casting dope for the second layer is cast onto it in a mode of extrusion through a casting Giesser, and if desired, three or more layers are successively formed in the same mode of casting and lamination, and at a suitable time, the resulting laminate film is peeled away from the support and dried. The coating method is generally as follows: A film of a core layer is formed according to a solution casting method, then a coating solution for surface layer is prepared, and using a suitable coater, the coating solution is applied onto the previously formed core film first on one surface thereof and next on the other surface thereof, or simultaneously on both surfaces thereof, and the resulting laminate film is dried.

The support for use in producing the film containing an optically-anisotropic layer is preferably an endlessly running metal support. As the endlessly running metal support, usable is a drum of which the surface is mirror-finished by chromium plating, or a stainless belt (band) of which the surface is mirror-finished by polishing. One or more pressure dies may be arranged above the metal support. Preferably, one or two pressure dies are arranged. In case where two or more pressure dies are arranged, the dope to be cast may be divided into portions suitable for the individual dies; or the dope may be fed to the die at a suitable proportion via a plurality of precision metering gear pumps. The temperature of the cellulose acylate solution to be cast is preferably from −10 to 55° C., more preferably from 25 to 50° C. In this case, the solution temperature may be the same throughout the entire process, or may differ in different sites of the process. In case where the temperature differs in different sites, the dope shall have the desired temperature just before cast.

The production method for the film containing an optically-anisotropic layer includes a step of stretching the formed cellulose acylate laminate film at a temperature of not lower than Tg −30° C. while the film is in a state containing the residual solvent therein in an amount of at least 5% by mass of the mass of the entire film. As described above, the film containing an optically-anisotropic layer is characterized by having enhanced wavelength dispersion characteristics of retardation, and the film can be given the optical performance through the stretching treatment and the stretching treatment may further give a desired retardation to the film. The stretching direction of the cellulose acylate film may be any of the machine direction or the direction (cross direction) perpendicular to the machine direction, and the film may be favorably stretched in any direction; however, more preferably, the film is stretched in the direction (cross direction) perpendicular to the machine direction from the viewpoint of the subsequent process of processing a polarizer using the film.

The method of stretching in the cross direction is described, for example, in JP-A 62-115035, 4-152125, 4-284211, 4-298310, 11-48271, etc. For the machine-direction stretching, for example, the speed of the film conveyor rollers is regulated so that the film winding speed could be higher than the film peeling speed whereby the film may be stretched. For the cross-direction stretching, the film is conveyed while held by a tenter on the sides thereof and the tenter width is gradually broadened, whereby the film can be stretched. After dried, the film may be stretched with a stretcher (preferably for monoaxial stretching with a long stretcher).

The draw ratio in stretching the film containing an optically-anisotropic layer is preferably from 5% to 200%, more preferably from 10% to 100%, even more preferably from 20% to 50%.

In case where the cellulose acylate film is used as a protective film for a polarizing element, the transmission axis of the polarizing element must be in parallel to the in-plane slow axis of the cellulose acylate film so as to prevent the light leakage in oblique directions to the polarizer. The transmission axis of the roll film-type polarizing element that is produced continuously is generally parallel to the cross direction of the roll film, and therefore, in continuously sticking the roll film-type polarizing element and a protective film comprising the roll film-type cellulose acylate film, the in-plane slow axis of the roll film-type protective film must be parallel to the cross direction of the film. Accordingly, the film is preferably stretched to a larger extent in the cross direction. The stretching treatment may be attained during the course of the film formation process, or the wound film may be unwound and stretched. However, in the production method for the film containing an optically-anisotropic layer, the film is stretched while it still contains the residual solvent therein, and therefore, it is desirable that the stretching treatment is attained during the course of the film formation process.

Preferably, the production method for the film containing an optically-anisotropic layer includes a step of drying the cellulose acylate laminate film and a step of stretching the dried cellulose acylate laminate film at a temperature not lower than (Tg−10° C.), from the viewpoint of enhancing the retardation of the film.

For drying the dope on a metal support in production of the film containing an optically-anisotropic layer, generally employable is a method of applying hot air to the surface of the metal support (drum or belt), or that is, onto the surface of the web on the metal support; a method of applying hot air to the back of the drum or belt; or a back side liquid heat transfer method that comprises contacting a temperature-controlled liquid with the opposite side of the dope-cast surface of the belt or drum, or that is, the back of the belt or drum to thereby heat the belt or drum by heat transmission to control the surface temperature thereof. Preferred is the back side liquid heat transfer method. The surface temperature of the metal support before the dope is cast thereon may be any degree so far as it is not higher than the boiling point of the solvent used in the dope. However, for promoting the drying or for making the dope lose its flowability on the metal support, preferably, the temperature is set to be lower by from 1 to 10° C. than the boiling point of the solvent having the lowest boiling point of all the solvents in the dope. In case where the cast dope is peeled off after cooled but not dried, then this shall not apply to the case.

For controlling the thickness of the film, the solid concentration in the dope, the slit gap of the die nozzle, the extrusion pressure from the die, and the metal support speed may be suitably regulated so that the formed film could have a desired thickness.

Produced in the manner as above, the length of the cellulose acylate film to be wound up is preferably from 100 to 10000 m per roll, more preferably from 500 to 7000 m, even more preferably from 1000 to 6000 m. In winding the film, preferably, at least one side thereof is knurled, and the knurling width is preferably from 3 mm to 50 mm, more preferably from 5 mm to 30 mm, and the knurling height is preferably from 0.5 to 500 µm more preferably from 1 to 200 µm. This may be one-way or double-way knurling.

In general, in large-panel display devices, contrast reduction and color shift may be remarkable in oblique directions; and therefore the film containing an optically-anisotropic layer is especially suitable for use in large-panel display devices. In case where the film is used as an optical compensatory film for large-panel liquid crystal display devices, for example, the film is shaped to have a width of at least 1470 mm. The film containing an optically-anisotropic layer includes not only film sheets cut to have a size that may be directly incorporated in liquid crystal display devices but also long films continuously produced and rolled up into rolls. The optical compensatory film of the latter embodiment is stored and transported in the rolled form, and is cut into a desired size when it is actually incorporated into a liquid crystal display device or when it is stuck to a polarizing element or the like. The long film may be stuck to a polarizing element formed of a long polyvinyl alcohol film directly as they are long, and then when this is actually incorporated into a liquid crystal display device, it may be cut into a desired size. One embodiment of the long optical compensatory film rolled up into a roll may have a length of 2500 m/roll or more.

EXAMPLES

The invention is described more concretely with reference to the following Examples. In the following Examples, the materials, the reagents and the substances used, their amount and ratio, the details of the treatment and the treatment process may be suitably modified or changed not overstepping the spirit and the scope of the invention. Accordingly, the invention should not be limitatively interpreted by the Examples mentioned below.

Examples 1 to 25, and Comparative Examples 1 to 7

Preparation of Cellulose Acylate

Cellulose acylate was produced according to the method described in JP-A 10-45804 and 08-231761, and the degree of substitution thereof was measured. Concretely, as a catalyst, sulfuric acid (7.8 parts by mass relative to 100 parts by mass of cellulose) was added to cellulose, and a carboxylic acid to be the starting material for the acyl substituent was added thereto for acylation at 40° C. In this, the type and the amount of the carboxylic acid were controlled to thereby control the type of the acyl group and the degree of substitution with the group. After the acylation, the system was ripened at 40° C. Further, the cellulose acylate was washed with acetone to remove the low-molecular fraction therefrom.

Preparation of Cellulose Acylate Solution for Core Layer

The following ingredients were put into a mixing tank and stirred to dissolve the ingredients, thereby preparing a cellulose acylate solution for core layer (low-substitution layer) in Example 1. The amount of the solvent (methylene chloride and methanol) was suitably controlled to thereby make the cellulose acylate solution have a solid concentration of 22%.

| Cellulose acetate (having a degree of substitution of 2.43) | 100.0 parts by mass |
| --- | --- |
| Additive shown in Table 6 below | amount shown in Table 6 (part by mass) |
| Methylene chloride | 365.5 parts by mass |
| Methanol | 54.6 parts by mass |

Cellulose acylate solutions for core layer in other Examples and Comparative Examples were prepared in the same manner as in Example 1 except that the type of the acyl group and the degree of substitution in the cellulose acylate, the amount and the type of the additive were changed as in the Table mentioned below. The structures of the additives used here are shown in Table 5 below.

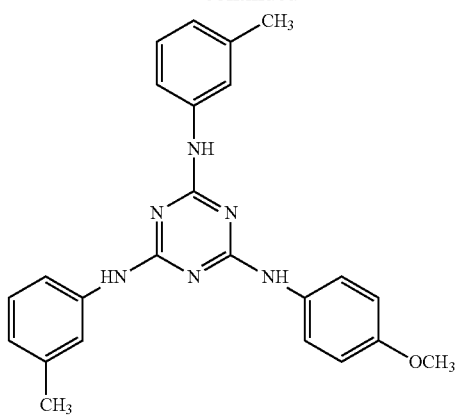

TABLE 5

| | | Dicarboxylic Acid Unit | | | Glycol Unit | | | |
| --- | --- | --- | --- | --- | --- | --- | --- | --- |
| | Molecular Weight | terephthalic acid (mol %) | phthalic acid (mol %) | adipic acid (mol %) | succinic acid (mol %) | ethylene glycol (mol %) | 1,2-propanediol (mol %) | PG ratio [%] | End |
| Ester 1 | 800 | 45 | 5 | 20 | 30 | 100 | 0 | 0 | Ac |
| Ester 2 | 800 | 70 | 0 | 0 | 30 | 50 | 50 | 50 | Ac |
| Ester 3 | 800 | 55 | 0 | 0 | 45 | 50 | 50 | 50 | Ac |
| Ester 4 | 1000 | 0 | 0 | 100 | 0 | 100 | 0 | 0 | OH |

Sugar 1:

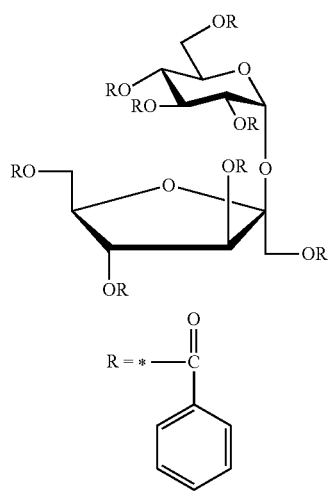

W1:

W2:

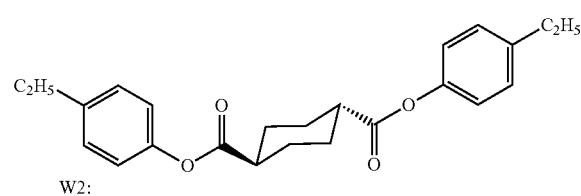

Preparation of Cellulose Acylate Solution for Outer Layer

The following ingredients were put into a mixing tank and stirred to dissolve the ingredients, thereby preparing a cellulose acylate solution for outer layer (high-substitution layer) in Example 1. The amount of the solvent (methylene chloride and methanol) was suitably controlled to thereby make the cellulose acylate solution have a solid concentration of 19.7%

| Cellulose acetate (having a degree of substitution of 2.79) | 100.0 parts by mass |
| --- | --- |
| Silica fine particles R972 (by Nippon Aerosil) | 0.15 parts by mass |
| Methylene chloride | 395.0 parts by mass |
| Methanol | 59.0 parts by mass |

Production of Cellulose Acylate Sample

The cellulose acylate solution for low-substitution layer was cast to form a core layer having the thickness as in Table 6 below, and the cellulose acylate solution for high-substitution layer was cast to form outer layers (skin layer A and skin B layer) each having the thickness as in Table 6. The formed web (film) was peeled from the band and clipped, and while the residual solvent amount in the film was from 20 to 5% by mass of the entire mass of the film, this was laterally stretched under the condition shown in Table 6 using a tenter. Next, the film was unclipped, dried at 130° C. for 20 minutes, and further using a tenter, this was again laterally stretched under the condition shown in the Table below.

The residual solvent amount was computed according to the following formula:

Residual Solvent Amount(% by mass)=$\{(M-N)/N\} \times 100$, wherein M indicates the mass of the web at an arbitrary time, and N indicates the mass of the same web after dried at 120° C. for 2 hours.

Specific configurations of the film samples obtained here are shown in Table 6 below.

The films were tested and evaluated for the characteristics thereof in the manner mentioned below.

<Haze of Film>

Liquid paraffin was applied to both sides of the film sample of 40 mm×80 mm, then the sample was sandwiched between two glass sheets, and analyzed according to JIS K-6714 using a haze meter (HGM-2DP, by Suga Test Instruments) at 25° C. and at a relative humidity of 60%. Separately, liquid paraffin alone was sandwiched between the two glass sheets and its haze was measured as a blank. The obtained results are shown in Table 6 below.

<Retardation of Film>

According to the method mentioned above, the film was analyzed for three-dimensional birefringence measurement at a wavelength of 440 nm, 550 nm and 630 nm using an automatic birefringence meter KOBRA-WR (by Oji Instruments), thereby measuring the in-plane retardation $Re(\lambda)$ (where $\lambda$ means the wavelength of light); and the thickness-direction retardation $Rth(\lambda)$ (where $\lambda$ means the wavelength of light) thereof was determined by measuring Re at different tilt angles. Re and Rth values at different wavelengths are shown in Table 6 below. In addition, the value of Re(630)–Re(440), and the value of Rth(630)–Rth(440) are shown in Table 6.

<Production of Polarizer Sample>

The surface of the cellulose acylate laminate film produced in the above was alkali-saponified. Briefly, the film was dipped in an aqueous solution of 1.5 N sodium hydroxide at 55° C. for 2 minutes, then washed in a water-washing bath at room temperature, and neutralized with 0.1 N sulfuric acid at 30° C. Again this was washed in a water-washing bath at room temperature, and then dried with hot air at 100° C. Subsequently, a roll of polyvinyl alcohol film having a thickness of 80 μm was unrolled and continuously stretched by 5 times in an aqueous iodine solution and dried to give a polarizing element having a thickness of 20 μm. Using a 3% aqueous solution of polyvinyl alcohol (Kuraray's PVA-117H) as an adhesive, the alkali-saponified cellulose acylate laminate film of Examples and Comparative Examples was stuck to Fujitac TD80UL (by FUJIFILM) that had been alkali-saponified like in the above, with the polarizing element sandwiched therebetween in such as manner that the saponified surfaces of the two films could face the polarizing element side, thereby producing a polarizer in which the cellulose acylate laminate film of Examples and Comparative examples, the polarizing element, TD80UL were stuck together in that order. The polarizing element and the films were so arranged that the MD direction of the cellulose acylate laminate film and the slow axis of TD80UL could be parallel to the absorption axis of the polarizing element.

<Production of Color Filter>

A color filter layer was formed by applying drops of a color filter ink to every pixel according to an inkjet method. The thickness of the color filter was determined by measuring the height difference between the glass substrate on which the color filter had been formed and the glass substrate on which the color filter had not been formed.

<Measurement of Liquid Crystal Cell>

Using Axometrics' Axoscan, the retardation of the cell was measured.

<Production of Liquid Crystal Display Device>

In Examples 1 to 18 and Comparative Examples 1 to 6, a VA-mode liquid crystal cell was produced and used. The thickness of the color filter of each pixel in the cell and the retardation values (measured value) of the cell are shown in Table 7 below. In Examples 19 to 25 and Comparative Example 7, the polarizers and the retardation plates were peeled away from the front side and the back side of the VA-mode liquid crystal TV shown in Table 7, and the thus taken-out liquid crystal cell was used. As in FIG. 1, an outer protective film (not shown), the polarizing element 11, the cellulose acylate laminate film 14 produced in the above and shown in Table 6 below, the liquid crystal cell 13 (the above-mentioned VA liquid crystal cell), the optically-anisotropic film (FUJITAC TD80UL) 15, the polarizing element 12 and an outer protective film (not shown) were stuck together with an adhesive in that order, thereby producing a liquid crystal display device of Examples and Comparative Examples. The upper and lower polarizers were so stuck that the absorption axes thereof could be perpendicular to each other.

<Evaluation of Liquid Crystal Display Device>

In the VA-mode liquid crystal display device produced in the above, a backlight was set on the side of the polarizing element 11 in FIG. 1. Using a tester (EZ-Contrast XL88, by ELDIM), the brightness and the chromaticity of the display panel at the time and black level or white level of display were measured in a dark room, and the color shift in the viewing angle direction at the time of black level of display, as well as the contrast ratio (CR) in the front direction and the viewing angle (polar angle 60 degrees) direction were computed.

(Color Shift in Viewing Angle (polar angle) Direction)

At the time of black level of display, the chromaticity change $\Delta x\theta$ and $\Delta y\theta$ in the case where the viewing angle was tilted toward the center line direction (azimuth angle 45 degrees) of the transmission axis of the pair of polarizers from the normal direction of the liquid crystal cell was measured in the polar angle range of from 0 to 80 degrees. In this, $\Delta x\theta = x\theta - x\theta_0$, $\Delta y\theta = y\theta - y\theta_0$; $(x\theta_0, y\theta_0)$ indicates the chromaticity measured in the liquid crystal cell normal direction at the time of black level of display; and $(x\theta, y\theta)$ indicates the chromaticity measured in the direction of the viewing angle as tilted in the center axis direction of the transmission axis of the pair of polarizers from the liquid crystal cell normal direction up to the polar axis $\theta$ degree at the time of black level of display.

The results were evaluated according to the following criteria. The evaluation is shown in Table 8 below.
A: Both $\Delta x\theta$ and $\Delta y\theta$ are at most 0.02.
B: Both $\Delta x\theta$ and $\Delta y\theta$ are at most 0.03.
C: Both $\Delta x\theta$ and $\Delta y\theta$ are at most 0.05.
D: Both $\Delta x\theta$ and $\Delta y\theta$ are more than 0.1.

With the film containing an optically-anisotropic layer, preferably, the color shift in the polar angle direction always satisfies the following numerical formulae (II) and (III):

$$0 \leq \Delta x\theta \leq 0.1 \qquad (II)$$

$$0 \leq \Delta y\theta \leq 0.1 \qquad (III)$$

(Contrast Ratio in Front Direction and Viewing Angle (Polar Angle 60 Degrees) Direction)

The contrast in the front direction and in the viewing angle (polar angle 60 degrees) direction was measured. The measured results were evaluated according to the following criteria.
A: The contrast ratio is 3000 or more and is favorable for practical use.

B: The contrast ratio is from 2000 to less than 3000 and has no problem in practical use.
C: The contrast ratio is from 1500 to less than 2000, but is on an industrial level.
D: The contrast ratio is less than 1500 and is problematic in practical use.

The evaluation is shown in Table 8 below.

TABLE 6

| | Film Production Method | | | | | | |
|---|---|---|---|---|---|---|---|
| | Core Layer | | | | | Outer Layer Degree of Substitution of Cellulose Acetate | Stretching Draw Ratio [%] |
| | Cellulose Acylate | | Additive 1 | | Additive 2 | | |
| | acyl group | degree of substitution | type | amount added [part by mass] | type | amount added [part by mass] | | |
| Comparative Example 1 | Ac | 2.43 | Ester 1 | 17 | — | — | 2.81 | 30 |
| Example 1 | Ac | 2.43 | Ester 1 | 17 | — | — | 2.81 | 30 |
| Example 2 | Ac | 2.43 | Ester 1 | 17 | — | — | 2.81 | 30 |
| Example 3 | Ac | 2.43 | Ester 1 | 17 | — | — | 2.81 | 30 |
| Example 4 | Ac | 2.43 | Ester 1 | 17 | — | — | 2.81 | 30 |
| Example 5 | Ac | 2.43 | Ester 1 | 17 | — | — | 2.81 | 30 |
| Comparative Example 2 | Ac | 2.43 | Ester 1 | 17 | — | — | 2.81 | 30 |
| Comparative Example 3 | Ac | 2.43 | Ester 3 | 19 | — | — | 2.81 | 30 |
| Example 6 | Ac | 2.43 | Ester 3 | 19 | — | — | 2.81 | 30 |
| Example 7 | Ac | 2.43 | Ester 3 | 15 | — | — | 2.81 | 30 |
| Example 8 | Ac | 2.43 | — | — | — | — | 2.81 | 30 |
| Example 9 | Ac | 2.81 | Ester 4 | 10 | W1 | 1 | 2.81 | 30 |
| Comparative Example 4 | Ac | 2.81 | Ester 4 | 5 | W1 | 2 | 2.81 | 30 |
| Comparative Example 5 | Ac | 2.43 | Ester 3 | 19 | — | — | 2.81 | 30 |
| Example 10 | Ac | 2.43 | Ester 3 | 19 | — | — | 2.81 | 30 |
| Example 11 | Ac | 2.43 | Ester 3 | 15 | — | — | 2.81 | 30 |
| Example 12 | Ac | 2.43 | — | — | — | — | 2.81 | 30 |
| Example 13 | Ac | 2.81 | Ester 4 | 10 | W1 | 1 | 2.81 | 30 |
| Comparative Example 6 | Ac | 2.81 | Ester 4 | 5 | W1 | 2 | 2.81 | 30 |
| Example 14 | Ac | 2.43 | Ester 1 | 17 | — | — | 2.81 | 30 |
| Example 15 | Ac | 2.43 | Ester 2 | 20 | — | — | 2.81 | 30 |
| Example 16 | Ac | 2.43 | Ester 3 | 19 | — | — | 2.81 | 30 |
| Example 17 | Ac | 2.43 | Ester 3 | 19 | — | — | 2.81 | 35 |
| Example 18 | Ac | 2.43 | Ester 3 | 19 | — | — | 2.81 | 40 |
| Example 19 | Ac | 2.43 | Ester 3 | 19 | — | — | 2.81 | 30 |
| Comparative Example 7 | Ac | 2.43 | Ester 3 | 19 | — | — | 2.81 | 30 |
| Example 20 | Ac | 2.43 | Ester 3 | 19 | — | — | 2.81 | 30 |
| Example 21 | Ac | 2.43 | Ester 3 | 19 | — | — | 2.81 | 30 |
| Example 22 | Ac | 2.43 | Ester 3 | 19 | — | — | 2.81 | 30 |
| Example 23 | Ac | 2.43 | Ester 3 | 19 | — | — | 2.81 | 30 |
| Example 24 | Ac/Pr | 1.6/0.7 | Sugar 1 | 8 | — | — | 2.81 | 30 |
| Example 25 | Ac | 2.43 | Ester 2 | 10 | W2 | 0.5 | 2.81 | 20 |

| | Film Properties | | | | | | | | |
|---|---|---|---|---|---|---|---|---|---|
| | | Retardation | | | | | | | |
| | | Re[nm] | | | | Rth[nm] | | | |
| | Total Thickness [μm] | Re (440) | Re (550) | Re (630) | Re (630) − Re (440) | Rth (440) | Rth (550) | Rth (630) | Rth (630) − Rth (440) | Haze [%] |
| Comparative Example 1 | 45.0 | 47.0 | 49.0 | 50.5 | 3.5 | 112.8 | 117.6 | 120.9 | 8.1 | 0.2 |
| Example 1 | 45.0 | 47.0 | 49.0 | 50.5 | 3.5 | 112.8 | 117.6 | 120.9 | 8.1 | 0.2 |
| Example 2 | 45.0 | 47.0 | 49.0 | 50.5 | 3.5 | 112.8 | 117.6 | 120.9 | 8.1 | 0.2 |
| Example 3 | 45.0 | 47.0 | 49.0 | 50.5 | 3.5 | 112.8 | 117.6 | 120.9 | 8.1 | 0.2 |
| Example 4 | 45.0 | 47.0 | 49.0 | 50.5 | 3.5 | 112.8 | 117.6 | 120.9 | 8.1 | 0.2 |
| Example 5 | 45.0 | 47.0 | 49.0 | 50.5 | 3.5 | 112.8 | 117.6 | 120.9 | 8.1 | 0.2 |
| Comparative Example 2 | 45.0 | 47.0 | 49.0 | 50.5 | 3.5 | 112.8 | 117.6 | 120.9 | 8.1 | 0.2 |
| Comparative Example 3 | 45.0 | 51.5 | 52.0 | 52.3 | 0.8 | 123.7 | 124.8 | 125.6 | 1.8 | 0.2 |
| Example 6 | 55.0 | 48.7 | 50.0 | 51.0 | 2.3 | 116.9 | 120.0 | 122.2 | 5.3 | 0.2 |
| Example 7 | 60.0 | 47.7 | 50.0 | 51.7 | 4.0 | 114.6 | 120.0 | 123.8 | 9.2 | 0.2 |

TABLE 6-continued

| | | | | | | | | | | |
|---|---|---|---|---|---|---|---|---|---|---|
| Example 8 | 65.0 | 45.4 | 50.0 | 53.4 | 8.0 | 109.1 | 120.0 | 127.5 | 18.4 | 0.2 |
| Example 9 | 70.0 | 42.2 | 49.0 | 53.9 | 11.7 | 101.7 | 117.6 | 128.6 | 26.9 | 0.2 |
| Comparative Example 4 | 80.0 | 43.5 | 51.0 | 56.5 | 13.0 | 104.7 | 122.4 | 134.6 | 29.9 | 0.2 |
| Comparative Example 5 | 45.0 | 49.5 | 50.0 | 50.3 | 0.8 | 118.9 | 120.0 | 120.8 | 1.8 | 0.2 |
| Example 10 | 55.0 | 48.7 | 50.0 | 51.0 | 2.3 | 116.9 | 120.0 | 122.2 | 5.3 | 0.2 |
| Example 11 | 60.0 | 48.7 | 51.0 | 52.7 | 4.0 | 117.0 | 122.4 | 126.2 | 9.2 | 0.2 |
| Example 12 | 60.0 | 47.4 | 52.0 | 55.4 | 8.0 | 113.9 | 124.8 | 132.2 | 18.4 | 0.2 |
| Example 13 | 60.0 | 42.2 | 49.0 | 53.9 | 11.7 | 101.7 | 117.6 | 128.6 | 26.9 | 0.2 |
| Comparative Example 6 | 70.0 | 42.5 | 50.0 | 55.5 | 13.0 | 102.3 | 120.0 | 132.2 | 29.9 | 0.2 |
| Example 14 | 60.0 | 38.3 | 40.0 | 41.3 | 3.0 | 91.9 | 96.0 | 98.8 | 6.9 | 0.1 |
| Example 15 | 57.0 | 43.3 | 45.0 | 46.3 | 3.0 | 103.9 | 108.0 | 110.8 | 6.9 | 0.2 |
| Example 16 | 55.0 | 48.7 | 50.0 | 51.0 | 2.3 | 116.9 | 120.0 | 122.2 | 5.3 | 0.2 |
| Example 17 | 53.0 | 58.3 | 60.0 | 61.3 | 3.0 | 139.9 | 144.0 | 146.8 | 6.9 | 0.3 |
| Example 18 | 50 | 63.2 | 65.0 | 66.2 | 3.0 | 151.9 | 156.0 | 158.8 | 6.9 | 0.4 |
| Example 19 | 52 | 47.0 | 49.0 | 50.4 | 3.4 | 116.4 | 121.0 | 124.2 | 7.8 | 0.5 |
| Comparative Example 7 | 52 | 47.0 | 49.0 | 50.4 | 3.4 | 116.4 | 121.0 | 124.2 | 7.8 | 0.5 |
| Example 20 | 52 | 47.0 | 49.0 | 50.4 | 3.4 | 116.4 | 121.0 | 124.2 | 7.8 | 0.5 |
| Example 21 | 52 | 47.0 | 49.0 | 50.4 | 3.4 | 116.4 | 121.0 | 124.2 | 7.8 | 0.5 |
| Example 22 | 52 | 47.0 | 49.0 | 50.4 | 3.4 | 116.4 | 121.0 | 124.2 | 7.8 | 0.5 |
| Example 23 | 52 | 47.0 | 49.0 | 50.4 | 3.4 | 116.4 | 121.0 | 124.2 | 7.8 | 0.5 |
| Example 24 | 40 | 47.8 | 49.0 | 49.9 | 2.1 | 118.1 | 121.0 | 123.0 | 4.8 | 0.4 |
| Example 25 | 70 | 49.3 | 50.0 | 50.5 | 1.2 | 217.1 | 220.0 | 221.9 | 4.8 | 0.3 |

TABLE 7

| | | Liquid crystal Cell | | | | | | |
|---|---|---|---|---|---|---|---|---|
| | | Thickness of Color Filter [μm] | | | Measured Values of Optical Characteristics of Liquid crystal Cell [nm] | | | Liquid crystal Cell Wavelength Dispersion Rth [cell] (630) − Rth [cell] (440) |
| | | dB | dG | dR | Rth [cell] (440) | Rth [cell] (550) | Rth[cell] (630) | |
| Comparative Example 1 | hand-made | 1.91 | 2.00 | 2.06 | 338 | 320 | 308 | −30 |
| Example 1 | hand-made | 1.95 | 1.99 | 2.04 | 331 | 320 | 313 | −18 |
| Example 2 | hand-made | 1.97 | 2.00 | 2.02 | 326 | 320 | 316 | −10 |
| Example 3 | hand-made | 2.00 | 2.01 | 2.00 | 320 | 320 | 320 | 0 |
| Example 4 | hand-made | 2.03 | 2.02 | 1.98 | 314 | 320 | 324 | 10 |
| Example 5 | hand-made | 2.05 | 1.98 | 1.96 | 309 | 320 | 327 | 18 |
| Comparative Example 2 | hand-made | 2.09 | 1.98 | 1.94 | 302 | 320 | 332 | 30 |
| Comparative Example 3 | hand-made | 2.00 | 1.99 | 2.00 | 320 | 320 | 320 | 0 |
| Example 6 | hand-made | 2.00 | 2.01 | 2.00 | 320 | 320 | 320 | 0 |
| Example 7 | hand-made | 2.00 | 2.02 | 2.00 | 320 | 320 | 320 | 0 |
| Example 8 | hand-made | 2.00 | 2.02 | 2.00 | 320 | 320 | 320 | 0 |
| Example 9 | hand-made | 2.00 | 2.00 | 2.00 | 320 | 320 | 320 | 0 |
| Comparative Example 4 | hand-made | 2.00 | 2.04 | 2.00 | 320 | 320 | 320 | 0 |
| Comparative Example 5 | hand-made | 2.04 | 2.03 | 1.97 | 311 | 320 | 326 | 15 |
| Example 10 | hand-made | 2.04 | 2.01 | 1.97 | 311 | 320 | 326 | 15 |
| Example 11 | hand-made | 2.04 | 1.98 | 1.97 | 311 | 320 | 326 | 15 |
| Example 12 | hand-made | 2.04 | 1.96 | 1.97 | 311 | 320 | 326 | 15 |
| Example 13 | hand-made | 2.04 | 1.97 | 1.97 | 311 | 320 | 326 | 15 |
| Comparative Example 6 | hand-made | 2.04 | 2.05 | 1.97 | 311 | 320 | 326 | 15 |
| Example 14 | hand-made | 2.01 | 2.05 | 1.99 | 317 | 320 | 322 | 5 |
| Example 15 | hand-made | 2.01 | 2.06 | 1.99 | 317 | 320 | 322 | 5 |
| Example 16 | hand-made | 2.01 | 2.01 | 1.99 | 317 | 320 | 322 | 5 |
| Example 17 | hand-made | 2.01 | 1.99 | 1.99 | 317 | 320 | 322 | 5 |
| Example 18 | hand-made | 2.01 | 2.00 | 1.99 | 317 | 320 | 322 | 5 |
| Example 19 | SONY-KDL52W5 | 3.07 | 2.98 | 3.19 | 333 | 340 | 323 | −10 |
| Comparative Example 7 | SEC-Bravia KDL40J-5000 | 1.71 | 1.82 | 1.97 | 349 | 340 | 328 | −21 |
| Example 20 | SONY-KDL32S-2500 | 1.89 | 2.02 | 2.10 | 330 | 320 | 314 | −17 |
| Example 21 | SEC-TN LSXL2370KF | 2.14 | 2.15 | 2.24 | 322 | 321 | 314 | −8 |
| Example 22 | SC-LC46X1 | 1.97 | 1.94 | 1.94 | 318 | 320 | 315 | −3 |
| Example 23 | Mitsubishi LCD-40MZW100 | 2.24 | 2.14 | 1.93 | 329 | 337 | 354 | 25 |
| Example 24 | SC-LC46X1 | 1.97 | 1.94 | 1.94 | 318 | 320 | 315 | −3 |
| Example 25 | SC-LC46X1 | 1.97 | 1.94 | 1.94 | 318 | 320 | 315 | −3 |

TABLE 8

| | Configuration of Liquid crystal Display Device | | | | | | | | | | | |
|---|---|---|---|---|---|---|---|---|---|---|---|---|
| | Film Characteristics | | | | | | | | Liquid crystal Cell | | Evaluation | | |
| | Retardation [nm] | | | | | | | | optical characteristics [nm] | (wavelength dispersion characteristics of retardation of liquid crystal cell)/2 − wavelength dispersion characteristics of Re of film [nm] | | | |
| | Re (550) | wavelength dispersion characteristics of Re Re (630) − Re (440) | Rth (550) | wavelength dispersion characteristics of Rth Rth (630) − Rth (440) | Haze [%] | thickness of color filter [μm] dB | dG | dR | wavelength dispersion characteristics of retardation of liquid crystal cell Rth [cell] (630) − Rth [cell] (440) | | color shift | viewing angle contrast | front contrast |
| Comparative Example 1 | 49.0 | 3.5 | 117.6 | 8.1 | 0.2 | 1.91 | 2.00 | 2.06 | −30 | −18.5 | D | C | B |
| Example 1 | 49.0 | 3.5 | 117.6 | 8.1 | 0.2 | 1.95 | 1.99 | 2.04 | −18 | −12.5 | B | B | B |
| Example 2 | 49.0 | 3.5 | 117.6 | 8.1 | 0.2 | 1.97 | 2.00 | 2.02 | −10 | −8.5 | B | B | B |
| Example 3 | 49.0 | 3.5 | 117.6 | 8.1 | 0.2 | 2.00 | 2.01 | 2.00 | 0 | −3.5 | A | A | B |
| Example 4 | 49.0 | 3.5 | 117.6 | 8.1 | 0.2 | 2.03 | 2.02 | 1.98 | 10 | 1.5 | B | B | B |
| Example 5 | 49.0 | 3.5 | 117.6 | 8.1 | 0.2 | 2.05 | 1.98 | 1.96 | 18 | 5.5 | B | B | B |
| Comparative Example 2 | 49.0 | 3.5 | 117.6 | 8.1 | 0.2 | 2.09 | 1.98 | 1.94 | 30 | 11.5 | D | D | B |
| Comparative Example 3 | 52.0 | 0.8 | 124.8 | 1.8 | 0.2 | 2.00 | 1.99 | 2.00 | 0 | −1 | D | D | B |
| Example 6 | 50.0 | 2.3 | 120.0 | 5.3 | 0.2 | 2.00 | 2.01 | 2.00 | 0 | −2.3 | B | B | A |
| Example 7 | 50.0 | 4.0 | 120.0 | 9.2 | 0.2 | 2.00 | 2.02 | 2.00 | 0 | −4 | A | A | A |
| Example 8 | 50.0 | 8.0 | 120.0 | 18.4 | 0.2 | 2.00 | 2.02 | 2.00 | 0 | −8 | B | B | A |
| Example 9 | 49.0 | 11.7 | 117.6 | 26.9 | 0.2 | 2.00 | 2.00 | 2.00 | 0 | −11.7 | B | B | B |
| Comparative Example 4 | 51.0 | 13.0 | 122.4 | 29.9 | 0.2 | 2.00 | 2.04 | 2.00 | 0 | −13 | D | D | B |
| Comparative Example 5 | 50.0 | 0.8 | 120.0 | 1.8 | 0.2 | 2.04 | 2.03 | 1.97 | 15 | 6.5 | D | D | B |
| Example 10 | 50.0 | 2.3 | 120.0 | 5.3 | 0.2 | 2.04 | 2.01 | 1.97 | 15 | 5.2 | B | B | B |
| Example 11 | 51.0 | 4.0 | 122.4 | 9.2 | 0.2 | 2.04 | 1.98 | 1.97 | 15 | 3.5 | B | B | A |
| Example 12 | 52.0 | 8.0 | 124.8 | 18.4 | 0.2 | 2.04 | 1.96 | 1.97 | 15 | −0.5 | A | A | A |
| Example 13 | 49.0 | 11.7 | 117.6 | 26.9 | 0.2 | 2.04 | 1.97 | 1.97 | 15 | −4.2 | A | A | B |
| Comparative Example 6 | 50.0 | 13.0 | 120.0 | 29.9 | 0.2 | 2.04 | 2.05 | 1.97 | 15 | −5.5 | D | D | B |
| Example 14 | 40.0 | 3.0 | 96.0 | 6.9 | 0.1 | 2.01 | 2.05 | 1.99 | 5 | −0.5 | C | C | B |
| Example 15 | 45.0 | 3.0 | 108.0 | 6.9 | 0.2 | 2.01 | 2.06 | 1.99 | 5 | −0.5 | B | B | B |
| Example 16 | 50.0 | 2.3 | 120.0 | 5.3 | 0.2 | 2.01 | 2.01 | 1.99 | 5 | −0.5 | A | A | A |
| Example 17 | 60.0 | 3.0 | 144.0 | 6.9 | 0.3 | 2.01 | 1.99 | 1.99 | 5 | −0.5 | B | B | B |
| Example 18 | 65.0 | 3.0 | 156.0 | 6.9 | 0.4 | 2.01 | 2.00 | 1.99 | 5 | −0.5 | C | C | B |
| Example 19 | 49.0 | 3.4 | 121.0 | 7.8 | 0.5 | 3.07 | 2.98 | 3.19 | −10 | −8.2 | B | B | B |
| Comparative Example 7 | 49.0 | 3.4 | 121.0 | 7.8 | 0.5 | 1.71 | 1.82 | 1.97 | −21 | −13.8 | D | D | B |
| Example 20 | 49.0 | 3.4 | 121.0 | 7.8 | 0.5 | 1.89 | 2.02 | 2.10 | −17 | −11.8 | C | C | B |
| Example 21 | 49.0 | 3.4 | 121.0 | 7.8 | 0.5 | 2.14 | 2.15 | 2.24 | −8 | −7.4 | B | B | B |
| Example 22 | 49.0 | 3.4 | 121.0 | 7.8 | 0.5 | 1.97 | 1.94 | 1.94 | −3 | −4.7 | A | A | A |
| Example 23 | 49.0 | 3.4 | 121.0 | 7.8 | 0.5 | 2.24 | 2.14 | 1.93 | 25 | 9 | C | B | B |
| Example 24 | 49.0 | 2.1 | 121.0 | 4.8 | 0.4 | 1.97 | 1.94 | 1.94 | −3 | −3.4 | A | A | A |
| Example 25 | 50.0 | 1.2 | 220.0 | 4.8 | 0.3 | 1.97 | 1.94 | 1.94 | −3 | −2.5 | B | B | B |

From Table 8, it is known that the liquid crystal display devices of the invention are good as free from color shift in viewing angle directions, and that the display characteristics of the devices are obviously improved. In addition, it is also know that in more preferred embodiments of the liquid crystal display device of the invention, the contrast in both the front direction and the viewing angle direction is good.

On the other hand, it is known that, in case where the dispersion wavelength characteristics of retardation of the liquid crystal cell are lower than the lower limit of the range of the invention, as in Comparative Examples 1 and 7, the liquid crystal display device is troubled by color shift even though the wavelength dispersion characteristics of Re of the film containing an optically-anisotropic layer in the polarizer fall within the range of the invention. From Comparative Example 2, it is known that, in case where the dispersion wavelength characteristics of retardation of the liquid crystal cell are higher than the higher limit of the range of the invention, the liquid crystal display device is also troubled by color shift even though the wavelength dispersion characteristics of Re of the film containing an optically-anisotropic layer in the polarizer fall within the range of the invention. From Comparative Examples 3 and 5, it is known that, in case where the dispersion wavelength characteristics of Re of the film containing an optically-anisotropic layer in the polarizer are lower than the lower limit of the range of the invention, the liquid crystal display device is also troubled by color shift even though the wavelength dispersion characteristics of the liquid crystal cell fall within the range of the invention. From Comparative Examples 4 and 6, it is known that, in case where the dispersion wavelength characteristics of Re of the film containing an optically-anisotropic layer in the polarizer are higher than the higher limit of the range of the invention, the liquid crystal display device is also troubled by color shift even though the wavelength dispersion characteristics of the liquid crystal cell fall within the range of the invention.

From the above, it is known that the liquid crystal display device of the invention can significantly solve the problem of color shift at viewing angles.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2011-091093, filed on Apr. 15, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display device comprising a liquid crystal cell and a polarizer arranged on at least one outer side of the liquid crystal cell, wherein: the liquid crystal cell includes a pair of substrates at least one of which has an electrode and which are arranged oppositely to each other, and a liquid crystal layer sandwiched between the substrates, and at least one substrate includes at least three color pixels of pixels of blue, green and red satisfying the following formula (1-1), and the polarizer includes a polarizing element and a film satisfying the following formula (1-2) and containing an optically-anisotropic layer: (1-1) $-20$ nm$<=\{$Rth[cell] (630)$-$Rth[cell] (440)$\}<=28$ nm, wherein Rth[cell] (lambda) means the thickness-direction retardation of the liquid crystal cell when a light having a wavelength $\lambda$ passes through at least one of the at least three color pixels of the cell; (1-2) 1 nm$<$Re(630)$-$Re(440)$<=12$ nm, wherein Re(630) means the in-plane retardation of the film at a wavelength of 630 nm, and Re(440) means the in-plane retardation thereof at a wavelength of 440 nm.

2. The liquid crystal display device according to claim 1, wherein the film satisfying the formula (1-2) is a film satisfying the following formula:

3 nm≤Re(630)−Re(440)≤4 nm.

3. The liquid crystal display device according to claim 2, wherein $\Delta x\theta$ and $\Delta y\theta$ are at most 0.05.

4. The liquid crystal display device according to claim 1, wherein the film containing an optically-anisotropic layer of the polarizer satisfies the following formula (2):

3 nm≤Rth(630)−Rth(440)≤28 nm, (2)

wherein Rth(630) means the thickness-direction retardation of the film at a wavelength of 630 nm, and Rth(440) means the thickness-direction retardation thereof at a wavelength of 440 nm.

5. The liquid crystal display device according to claim 4, wherein the film satisfying the formula (2) is a film satisfying the following formula:

3 nm≤Rth(630)−Rth(440)≤10 nm.

6. The liquid crystal display device according to claim 1, wherein the film containing an optically-anisotropic layer of the polarizer satisfies the following formula (3):

45 nm≤Re(550)≤60 nm, (3)

wherein Re(550) means the in-plane retardation of the film at a wavelength of 550 nm.

7. The liquid crystal display device according to claim 6, wherein the film satisfying the formula (3) is a film satisfying the following formula:

50 nm≤|Rth(550)|≤250 nm.

8. The liquid crystal display device according to claim 1, wherein at least one of the at least three color pixels satisfies the following formula (4): (4)$-20$ nm$<=\{$Rth[cell] (630)$-$Rth[cell] (440)$\}<=20$ nm, wherein Rth[cell] (lambda) means the thickness-direction retardation of the liquid crystal cell when a light having a wavelength $\lambda$ passes through at least one of the at least three color pixels of the cell.

9. The liquid crystal display device according to claim 8, wherein the film satisfying the formula (4) is a film satisfying the following formula:

−15 nm≤{Rth[cell](630)−Rth[cell](440)}≤15 nm.

10. The liquid crystal display device according to claim 1, wherein at least one of the at least three color pixels and the film containing an optically-anisotropic layer satisfy the following formula (5): (5)$-5$ nm$<=\{$Rth[cell] (630)$-$Rth[cell] (440)$\}/2-\{$Re(630)$-$Re(440)$\}<=-3$ nm, wherein Rth[cell] (lambda) means the thickness-direction retardation of the liquid crystal cell when a light having a wavelength $\lambda$ passes through at least one of the at least three color pixels of the cell, Re(630) means the in-plane retardation of the film at a wavelength of 630 nm, and Re(440) means the in-plane retardation thereof at a wavelength of 440 nm.

11. The liquid crystal display device according to claim 10, wherein the film satisfying the formula (5) is a film satisfying the following formula:

−4.7 nm ≤{Rth[cell](630)−Rth[cell](440)}/2−{Re(630)−Re(440)}≤−3.4 nm.

12. The liquid crystal display device according to claim 1, wherein the substrate including at least three color pixels of blue, green and red is a color filter substrate having a color filter that that comprises a red pixel, a green pixel and a blue pixel.

13. The liquid crystal display device according to claim 12, wherein the color filter satisfies dB>dG>dR in which dB is the thickness of the blue pixel, dG is the thickness of the green pixel and dR is the thickness of the red pixel.

14. The liquid crystal display device according to claim 13, wherein dB is at most 2.5 μm, dG is at most 2.4 μm and dR is at most 2.4 μm.

15. The liquid crystal display device according to claim 1, wherein the liquid crystal cell is a VA-mode cell.

16. The liquid crystal display device according to claim 1, wherein the film containing an optically-anisotropic layer of the polarizer is a cellulose acylate film.

17. The liquid crystal display device according to claim 16, wherein the cellulose acylate film comprises a low-substitution layer that contains a cellulose acylate satisfying the following formula (101) and a non-phosphate compound, and, as laminated on at least one side of the low-substitution layer, a high-substitution layer that contains a cellulose acylate satisfying the following formula (102), and the in-plane retardation of the cellulose acylate film at a wavelength of 550 nm is larger than the in-plane retardation thereof at a wavelength of 440 nm;

$$2.0 < Z1 < 2.7 \tag{101}$$

wherein $Z1$ represents the total degree of acyl substitution of the cellulose acylate of the low-substitution layer;

$$2.7 < Z2 \tag{102}$$

wherein $Z2$ represents the total degree of acyl substitution of the cellulose acylate of the high-substitution layer.

18. The liquid crystal display device according to claim 17, wherein the cellulose acylate film contains the non-phosphate compound in an amount from 1 to 35% by mass of the cellulose resin in the film.

19. The liquid crystal display device according to claim 17, wherein the non-phosphate compound is a high-molecular additive having a number-average molecular weight of from 700 to 10000.

20. The liquid crystal display device according to claim 17, wherein the non-phosphate compound is a sugar ester compound.

21. The liquid crystal display device according to claim 20, wherein the sugar ester compound has a number-average molecular weight of from 200 to 3500.

\* \* \* \* \*